United States Patent
Yoshida

(10) Patent No.: US 12,312,435 B2
(45) Date of Patent: May 27, 2025

(54) POLYURETHANE RESIN-FORMING COMPOSITION FOR MEMBRANE-SEALING MATERIAL, AND MEMBRANE AND MEMBRANE MODULE USING SAME

(71) Applicant: TOSOH CORPORATION, Shunan (JP)

(72) Inventor: Kouji Yoshida, Yokkaichi (JP)

(73) Assignee: TOSOH CORPORATION, Shunan (JP)

( * ) Notice: Subject to any disclaimer, the term of this patent is extended or adjusted under 35 U.S.C. 154(b) by 587 days.

(21) Appl. No.: 17/629,050

(22) PCT Filed: Jul. 17, 2020

(86) PCT No.: PCT/JP2020/027949
§ 371 (c)(1),
(2) Date: Mar. 24, 2022

(87) PCT Pub. No.: WO2021/015144
PCT Pub. Date: Jan. 28, 2021

(65) Prior Publication Data
US 2022/0275141 A1     Sep. 1, 2022

(30) Foreign Application Priority Data

Jul. 24, 2019  (JP) ................. 2019-136226
Jan. 22, 2020  (JP) ................. 2020-008738

(51) Int. Cl.
*C08G 18/36*   (2006.01)
*B01D 63/02*   (2006.01)
(Continued)

(52) U.S. Cl.
CPC ........... *C08G 18/36* (2013.01); *B01D 63/023* (2013.01); *B01D 63/04* (2013.01); *B01D 65/003* (2013.01);
(Continued)

(58) Field of Classification Search
CPC .... C08G 18/36; C08G 18/10; C08G 18/1825; C08G 18/2825; C08G 18/4233;
(Continued)

(56) References Cited

U.S. PATENT DOCUMENTS 4,170,559 A   10/1979  Kroplinski et al.
4,256,617 A    3/1981  Kroplinski et al.

FOREIGN PATENT DOCUMENTS

CN      105189398 A  * 12/2015 ............ B32B 17/06
JP      S63-172781 A     7/1988
(Continued)

OTHER PUBLICATIONS

Machine-generated English translation of JP 2019-056097, generated on Aug. 19, 2024.*

(Continued)

*Primary Examiner* — Fred Prince
(74) *Attorney, Agent, or Firm* — Squire Patton Boggs (US) LLP

(57) ABSTRACT

Provided is a polyurethane resin-forming composition for a membrane-sealing material, the polyurethane resin-forming composition contributing to formation of (1) a urethane resin that is excellent in moldability, has a suppressed elution amount of a low-molecular-weight reaction product, and has excellent appearance or (2) a urethane resin that has a low viscosity, is excellent in cast moldability, and has a reduced water elution amount of a low-molecular-weight reaction product and a reduced solvent elution amount of a molded product. The polyurethane resin-forming composition for a membrane-sealing material comprises: a polyisocyanate prepolymer (A) or an allophanate group-containing polyisocyanate prepolymer (A') comprising a reaction product of a diphenylmethane diisocyanate (a1-1) and/or a modified product of a diphenylmethane diisocyanate (a1-2), and an (Continued)

active hydrogen-containing compound (a2); and a castor oil polymerized polyol (b1) comprising a castor oil polymerization product.

10 Claims, 1 Drawing Sheet

(51) Int. Cl.
| | |
|---|---|
| *B01D 63/04* | (2006.01) |
| *B01D 65/00* | (2006.01) |
| *C08G 18/10* | (2006.01) |
| *C08G 18/18* | (2006.01) |
| *C08G 18/22* | (2006.01) |
| *C08G 18/28* | (2006.01) |
| *C08G 18/42* | (2006.01) |
| *C08G 18/48* | (2006.01) |
| *C08G 18/62* | (2006.01) |
| *C08G 18/73* | (2006.01) |
| *C08G 18/76* | (2006.01) |
| *C08G 18/78* | (2006.01) |
| *C08G 18/79* | (2006.01) |
| *C09K 3/10* | (2006.01) |

(52) U.S. Cl.
CPC ......... *C08G 18/10* (2013.01); *C08G 18/1825* (2013.01); *C08G 18/2825* (2013.01); *C08G 18/4233* (2013.01); *C08G 18/4244* (2013.01); *C08G 18/4825* (2013.01); *C08G 18/4891* (2013.01); *C08G 18/62* (2013.01); *C08G 18/735* (2013.01); *C08G 18/7671* (2013.01); *C08G 18/7837* (2013.01); *C08G 18/797* (2013.01); *C09K 3/10* (2013.01); *C08G 18/222* (2013.01); *C08G 18/78* (2013.01); *C08G 2190/00* (2013.01); *C08G 2340/00* (2013.01); *C09K 3/1021* (2013.01)

(58) Field of Classification Search
CPC ............ C08G 18/4244; C08G 18/4825; C08G 18/4891; C08G 18/62; C08G 18/735; C08G 18/7671; C08G 18/7837; C08G 18/797; C08G 18/222; C08G 18/78; C08G 2190/00; C08G 2340/00; C08G 18/3275; B01D 63/023; B01D 63/04; B01D 65/003; C09K 3/10; C09K 3/1021
USPC ..................................................... 210/321.87
See application file for complete search history.

(56) References Cited

FOREIGN PATENT DOCUMENTS

| JP | H1-129097 A | | 5/1989 | |
|---|---|---|---|---|
| JP | H-0625383 A | | 2/1994 | |
| JP | 2009-030059 A | | 2/2009 | |
| JP | 2017-006874 A | | 1/2017 | |
| JP | 2017149977 A | * | 8/2017 | |
| JP | 2018-111756 A | | 7/2018 | |
| JP | 2019-006856 A | | 1/2019 | |
| JP | 2019-019258 A | | 2/2019 | |
| JP | 2019-056097 A | | 4/2019 | |
| WO | WO-2007074597 A1 | * | 7/2007 | ........... B01D 63/023 |
| WO | WO 2011/074238 A1 | | 6/2011 | |
| WO | WO 2019/022103 A1 | | 1/2019 | |

OTHER PUBLICATIONS

Machine-generated English translation of JP 2017-149977, generated on Aug. 19, 2024.*
Machine-generated English translation of WO 2007/074597, generated on Aug. 19, 2024.*
Machine-generated English translation of CN 105189398, generated on Jan. 27, 2025.*
International Search Report mailed Sep. 15, 2020 for International Application No. PCT/JP2020/027949, with translation, 5 pages.
International Preliminary Report on Patentability and Written Opinion mailed Jan. 25, 2022 for International Application No. PCT/JP2020/027949, 11 pages.
Extended European Search Report mailed Sep. 19, 2023, for European Patent Application No. 20844924.9, 8 pages.
Indian Examination Report under Sections 12 & 13 of the Patents Act, 1970 and the Patent Rules, 2003, for Indian Patent Application No. 202247008839, dated Mar. 2, 2023, with translation, 6 pages.

* cited by examiner

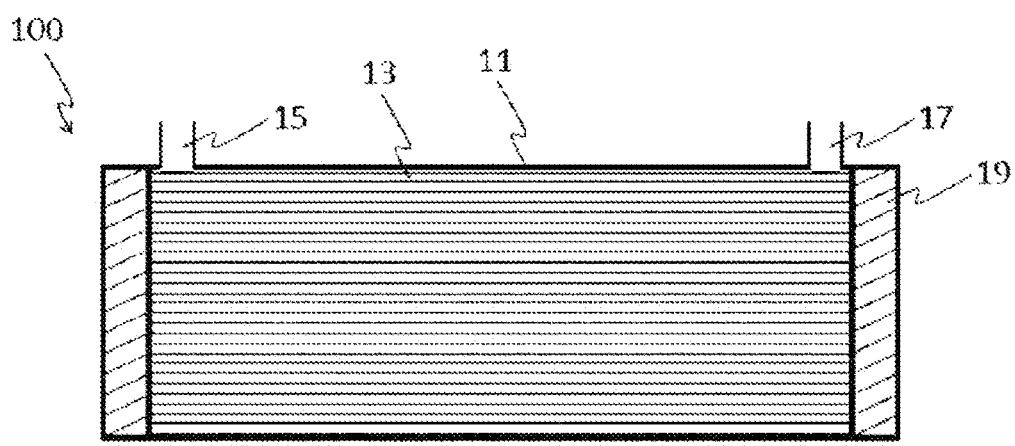

POLYURETHANE RESIN-FORMING COMPOSITION FOR MEMBRANE-SEALING MATERIAL, AND MEMBRANE AND MEMBRANE MODULE USING SAME

CROSS-REFERENCE TO RELATED APPLICATIONS

This application is a National Stage filing under 35 U.S.C. § 371 of International Patent Application No. PCT/JP2020/027949, filed Jul. 17, 2020, which claims the benefit of priority to JP Application No. 2020-008738, filed Jan. 22, 2020 and further claims the benefit of priority to JP Application No. 2019-136226, filed Jul. 24, 2019.

TECHNICAL FIELD

The present disclosure relates to a polyurethane resin-forming composition for a membrane-sealing material, and a membrane-sealing material and a membrane module that use the same.

BACKGROUND ART

As a hollow fiber membrane to be used in a hollow fiber membrane module, there is mentioned a glycerin-containing hollow fiber membrane in which a retaining agent (glycerin) is used in order to maintain fine pores of a membrane. However, in the glycerin-containing hollow fiber membrane, it has been known that, when a polyurethane resin-forming composition comprising diphenylmethane diisocyanate (hereinafter, abbreviated as MDI) is used at the time of cast molding, a low-molecular-weight reaction product of MDI and glycerin is generated, and this reaction product is eluted in a liquid present around the hollow fiber membrane.

In this regard, Patent Literature 1 discloses a polyurethane resin-forming composition for a sealing material of a membrane module, the polyurethane resin-forming composition comprising a polyisocyanate component (base agent), which comprises an isocyanate group-terminated prepolymer obtained from a reaction product of MDI and castor oil, and a polyol component (curing agent). Further, Patent Literature 1 discloses that the elution amount of a polyurethane resin obtained from this polyurethane resin-forming composition for a sealing material is reduced.

Furthermore, in recent years, in order to improve the productivity of a polyurethane resin for cast molding, a urethane resin having a high mechanical strength is required.

In this regard, Patent Literature 2 discloses a polyurethane resin-forming composition that uses carbodiimide-modified MDI as an isocyanate component and a castor oil polymerization product as a polyol component. Further, Patent Literature 2 discloses that this polyurethane resin-forming composition is excellent in mechanical properties.

Furthermore, an allophanate group-containing polyisocyanate prepolymer derived from MDI and a monool is easily handled since the viscosity is low and the precipitation of MDI at a low temperature is small, and thus it is useful in the fields of adhesives and sealing materials and is widely applied.

Patent Literature 3 discloses that an allophanate group-containing polyisocyanate prepolymer derived from MDI and a polyether monool has a low viscosity, and an elastomer obtained from this prepolymer is excellent in mechanical properties.

CITATION LIST

Patent Literature

Patent Literature 1: Japanese Unexamined Patent Publication No. H6-25383
Patent Literature 2: Japanese Unexamined Patent Publication No. S63-172781
Patent Literature 3: Japanese Unexamined Patent Publication No. 2009-030059

SUMMARY OF INVENTION

Technical Problem

However, in the composition of Patent Literature 1, the viscosity of the base agent is high, and thus the viscosity is required to be reduced. Therefore, the composition of Patent Literature 1 has a problem in that the viscosity at the initial stage of mixing the base agent and the curing agent is high, and filling troubles at the time of molding may occur.

Furthermore, the composition of Patent Literature 2 has problems in that compatibility at the time of molding may be poor and poor appearance of a molded product may occur.

Furthermore, the composition of Patent Literature 3 has a problem in that the amount of eluted product from the urethane resin is large, and a decrease in elution amount is desired.

Therefore, one aspect of the present disclosure is directed to provide a polyurethane resin-forming composition being excellent in moldability, and contributing to formation of a urethane resin that has a suppressed elution amount of a low-molecular-weight reaction product of diphenylmethane diisocyanate and glycerin and has excellent appearance, and to provide a sealing material and a membrane module that use the forming composition.

Furthermore, another aspect of the present disclosure is directed to provide a polyurethane resin-forming composition having a low viscosity, being excellent in cast moldability and contributing to formation of a urethane resin that has a reduced water elution amount of a low-molecular-weight reaction product of diphenylmethane diisocyanate and glycerin and a reduced solvent elution amount of a molded product, and to provide a sealing material and a membrane module that use the forming composition.

Solution to Problem

According to one aspect of the present disclosure, there is provided a polyurethane resin-forming composition for a membrane-sealing material, comprising:
  a polyisocyanate prepolymer (A); and
  a curing agent (B), wherein
  the polyisocyanate prepolymer (A) comprises a reaction product of
    a diphenylmethane diisocyanate (a1-1) and/or a modified product of a diphenylmethane diisocyanate (a1-2), and
    an active hydrogen-containing compound (a2),
  the curing agent (B) comprises a castor oil polymerized polyol (b1),
  the castor oil polymerized polyol (b1) comprises a castor oil polymerization product, and
  a content of the castor oil polymerization product is 1 mass % or more and 35 mass % or less with respect to a total amount of the polyisocyanate prepolymer (A) and the curing agent (B).

According to another aspect of the present disclosure, there is provided a polyurethane resin-forming composition for a membrane-sealing material, comprising:
an allophanate group-containing polyisocyanate prepolymer (A');
a curing agent (B), wherein
the allophanate group-containing polyisocyanate prepolymer (A') comprises a reaction product of
a diphenylmethane diisocyanate (a1-1), and
an active hydrogen-containing compound (a2),
the curing agent (B) comprises a castor oil polymerized polyol (b1),
the castor oil polymerized polyol (b1) comprises a castor oil polymerization product, and
a crosslinking group density of the polyurethane resin-forming composition for a membrane-sealing material is 0.65 mmol/g or more with respect to a total mass of the allophanate group-containing polyisocyanate prepolymer (A') and the curing agent (B).

According to still another aspect of the present disclosure, there is provided a polyurethane resin-forming composition for a membrane-sealing material, comprising:
an allophanate group-containing polyisocyanate prepolymer (A');
a curing agent (B), wherein
the allophanate group-containing polyisocyanate prepolymer (A') comprises a reaction product of
a diphenylmethane diisocyanate (a1-1), and
an active hydrogen-containing compound (a2),
the curing agent (B) comprises a castor oil polymerized polyol (b1),
the castor oil polymerized polyol (b1) comprises a castor oil polymerization product, and
a content of the castor oil polymerization product is 1 mass % or more and 35 mass % or less with respect to a total amount of the allophanate group-containing polyisocyanate prepolymer (A') and the curing agent (B).

According to still another aspect of the present disclosure, there is provided a membrane-sealing material comprising a cured product of the above-described polyurethane resin-forming composition for a membrane-sealing material.

According to still another aspect of the present disclosure, there is provided a membrane module including:
a main body unit;
a membrane; and
a membrane-sealing material sealing a gap between the main body unit and the membrane, wherein
the membrane-sealing material is the above-described membrane-sealing material.

Advantageous Effects of Invention

According to one aspect of the present disclosure, it is possible to provide a polyurethane resin-forming composition being excellent in moldability, and contributing to formation of a urethane resin that has a suppressed elution amount of a low-molecular-weight reaction product of diphenylmethane diisocyanate and glycerin and has excellent appearance, and to provide a sealing material and a membrane module that use the forming composition.

Furthermore, according to another aspect of the present disclosure, it is possible to provide a polyurethane resin-forming composition having a low viscosity, being excellent in cast moldability, and contributing to formation of a urethane resin that has a reduced water elution amount of a low-molecular-weight reaction product of MDI and glycerin and a reduced solvent elution amount of a molded product, and to provide a sealing material and a membrane module that use the forming composition.

BRIEF DESCRIPTION OF DRAWINGS

FIG. 1 is a conceptual diagram illustrating an example of a configuration of a membrane module according to one aspect of the present disclosure.

DESCRIPTION OF EMBODIMENTS

Hereinafter, exemplary embodiments of the present disclosure will be specifically described.

[First Aspect (Polyurethane Resin-Forming Composition for a Membrane-Sealing Material)]

A polyurethane resin-forming composition for a membrane-sealing material according to a first aspect of the present disclosure comprises
a polyisocyanate prepolymer (A), and
a curing agent (B), wherein
the polyisocyanate prepolymer (A) comprises a reaction product of
a diphenylmethane diisocyanate (a1-1) and/or a modified product of a diphenylmethane diisocyanate (a1-2), and
an active hydrogen-containing compound (a2),
the curing agent (B) comprises a castor oil polymerized polyol (b1),
the castor oil polymerized polyol (b1) comprises a castor oil polymerization product, and
a content of the castor oil polymerization product is 1 mass % or more and 35 mass % or less with respect to a total amount of the polyisocyanate prepolymer (A) and the curing agent (B).

<Polyisocyanate Prepolymer (A)>

The polyisocyanate prepolymer (A) comprises a reaction product of
a diphenylmethane diisocyanate (a1-1) and/or a modified product of a diphenylmethane diisocyanate (a1-2), and
an active hydrogen-containing compound (a2).

<<Diphenylmethane Diisocyanate (a1-1) and Modified Product Thereof (a1-2)>>

As the diphenylmethane diisocyanate (a1-1), a monomer of any diphenylmethane diisocyanate (hereinafter, also referred to as MDI) that can be generally available can also be used. Isomers of the MDI monomer usually include 0 mass % or more and 5 mass % or less of 2,2'-MDI, 0 mass % or more and 95 mass % or less of 2,4'-MDI, and 5 mass % or more and 100 mass % or less of 4,4'-MDI.

The modified product (a1-2) of MDI is not particularly limited, and examples thereof include a urethane modified product, a carbodiimide modified product, a polymeric product, a urea modified product, an allophanate modified product, a biuret modified product, a uretonimine modified product, a uretodion modified product, and the like. These may be used alone or as a mixture of two or more kinds thereof.

<<Active Hydrogen-Containing Compound (a2)>>

The active hydrogen-containing compound (a2) is not particularly limited as long as it is a compound containing active hydrogen. Examples of the active hydrogen-containing compound (a2) include polyols such as castor oil, a castor oil-modified polyol, a low-molecular-weight polyol, a polyether-based polyol, a polyester-based polyol, a polylactone-based polyol, and a polyolefin-based polyol, and the like.

Examples of the castor oil-modified polyol include linear or branched castor oil-modified polyols obtained by reaction between castor oil or castor oil fatty acid and at least one polyol selected from the group consisting of a low-molecular-weight polyol and polyether polyol. Specific examples thereof include diglycerides and monoglycerides of castor oil fatty acids; mono-, di-, and triesters of castor oil fatty acids and trimethylolalkanes; mono-, di-, and triesters of castor oil fatty acids and polypropylene glycols; and the like.

Note that, the main component of the castor oil is triglyceride of ricinoleic acid, and hydrogenated castor oil is included in the castor oil. Furthermore, the main component of the castor oil fatty acid is ricinoleic acid, and hydrogenated castor oil fatty acid is included in the castor oil fatty acid.

Furthermore, examples of the trimethylolalkane include trimethylolmethane, trimethylolethane, trimethylolpropane, trimethylolbutane, trimethylolpentane, trimethylolhexane, trimethylolheptane, trimethyloloctane, trimethylolnonane, trimethyloldecane, and the like.

The number average molecular weight of the castor oil-modified polyol is preferably 400 or more and 3000 or less and further preferably 500 or more and 2500 or less. By using a castor oil-modified polyol having a number average molecular weight of 400 or more and 3000 or less, a cured resin further excellent in properties required in the membrane-sealing material, particularly, mechanical properties can be formed.

The average hydroxyl value of the castor oil and the castor oil-modified polyol is preferably 20 mgKOH/g or more and 300 mgKOH/g or less and further preferably 40 mgKOH/g or more and 250 mgKOH/g or less. By using a castor oil-modified polyol having an average hydroxyl value of 20 mgKOH/g or more and 300 mgKOH/g or less, a cured resin further excellent in properties required in the membrane-sealing material, particularly, mechanical properties can be formed. Moreover, the productivity of the membrane-sealing material, and further, the productivity of the hollow fiber membrane module can also be improved.

Examples of the low-molecular-weight polyol include divalent polyols such as ethylene glycol, diethylene glycol, propylene glycol, 1,2-, 1,3- or 1,4-butanediol, 1,5-pentanediol, 3-methyl-1,5-pentanediol, 1,6-hexanediol, 1,8-octanediol, 1,10-decanediol, neopentyl glycol, and hydrogenerated bisphenol A, trivalent to octavalent polyols such as glycerin, trimethylol propane, hexanetriol, pentaerythritol, sorbitol, and sucrose, and the like. The number average molecular weight of the low-molecular-weight polyol is preferably 50 or more and 200 or less.

Examples of the polyether-based polyol include alkylene oxide (alkylene oxide having 2 to 8 carbon atoms, for example, ethylene oxide, propylene oxide, butylene oxide, and the like) adducts of the above-described low-molecular-weight polyol, ring-opening polymerization products of alkylene oxides, and the like, and specific examples thereof include polypropylene glycol, polyethylene glycol, polytetramethylene ether glycol, or a copolymerization product of ethylene oxide and propylene oxide, and the like. The number average molecular weight of the polyether-based polyol is preferably 200 or more and 7000 or less and further preferably 500 or more and 5000 or less, from the viewpoint of attaining further excellent molding processability at the time of producing a membrane-sealing material.

Examples of the polyester-based polyol include polyester-based polyols obtained by condensation polymerization of a polycarboxylic acid and a polyol.

Examples of the polycarboxylic acid to be used in polyester polyol include aliphatic saturated or unsaturated polycarboxylic acids and aromatic polycarboxylic acids such as adipic acid, azelaic acid, dodecanedioic acid, maleic acid, fumaric acid, itaconic acid, dimerized linoleic acid, phthalic acid, isophthalic acid, and terephthalic acid; and the like.

Furthermore, examples of the polyol used in the polyester-based polyol include the above-described low-molecular-weight polyol, polyether-based polyol, and the like.

The number average molecular weight of the polyester-based polyol is preferably 200 or more and 5000 or less and further preferably 500 or more and 3000 or less. By using polyester-based polyol having a number average molecular weight of 200 or more and 5000 or less, molding processability at the time of producing a membrane-sealing material is particularly excellent.

Examples of the polylactone-based polyol include polyols obtained by addition polymerization of ε-caprolactone, α-methyl-ε-caprolactone, ε-methyl-ε-caprolactone, β-methyl-δ-valerolactone, and the like with a polymerization initiator of glycols or triols, in the presence of a catalyst such as an organometallic compound, a metal chelate compound, or fatty acidic metal acyl compound. The number average molecular weight of the polylactone-based polyol is preferably 200 or more and 5000 or less and further preferably 500 or more and 3000 or less. By using polylactone-based polyol having a number average molecular weight of 200 or more and 5000 or less, molding processability at the time of producing a membrane-sealing material is particularly excellent.

Examples of the polyolefin-based polyol include polybutadiene-based polyols in which a hydroxyl group is introduced into the terminal of polybutadiene, or a copolymer of butadiene and styrene or acrylonitrile. Other than, examples thereof also include polyether ester polyols obtained by addition reaction of alkylene oxide, for example, ethylene oxide, propylene oxide, and the like with a polyester having a carboxyl group and a hydroxyl group at the terminal.

Among these, in consideration of compatibility with a curing agent (curing agent (B)), the active hydrogen-containing compound (a2) is preferably castor oil or a castor oil-modified polyol.

<<Formulation of Polyisocyanate Prepolymer (A)>>

The polyisocyanate prepolymer (A) comprises a reaction product of a diphenylmethane diisocyanate (a1-1) and/or a modified product of a diphenylmethane diisocyanate (a1-2), and an active hydrogen-containing compound (a2). This reaction product can be obtained by a urethanation reaction that is generally performed.

<<Content of Isocyanate Group>>

The content of the isocyanate group of the polyisocyanate prepolymer (A) is preferably 13.0 mass % or more and 21.0 mass % or less, more preferably 13.5 mass % or more and 20.5 mass % or less, and particularly preferably 14.0 mass % or more and 20.0 mass % or less. When the content is in these ranges, the molding processability of a polyurethane resin and adhesion strength are further excellent.

<<Content of MDI Monomer>>

The content of the MDI monomer is preferably 25 mass % or less with respect to the total amount of the polyurethane resin-forming composition for a membrane-sealing material in order to further reduce a low-molecular-weight reaction product of MDI and glycerin.

<<Reaction Temperature>>

The urethanation reaction is preferably performed at a temperature range of 40° C. or higher and 80° C. or lower until the NCO content reaches a target NCO content. When the reaction temperature is 40° C. or higher, the crystal precipitation of the monomer MDI can be favorably suppressed, and when the reaction temperature is 80° C. or lower, the generation of a side reaction product can be further suppressed.

<Curing Agent (B)>

The curing agent (B) comprises a castor oil polymerized polyol (b1).

Furthermore, it is preferable that the curing agent (B) comprises
- a castor oil polymerized polyol (31), and
- at least one (b2) selected from the group consisting of castor oil and a castor oil-modified polyol.

Further, in this aspect, it is more preferable that the curing agent (B) comprises
- a castor oil polymerized polyol (b1), and
- at least one (b2) selected from the group consisting of castor oil and a castor oil-modified polyol, and
- a hydroxyl group-containing amine-based compound (b3);
- a content of the hydroxyl group-containing amine-based compound (b3) in the curing agent (B) is 30 mass % or less.

<<Castor Oil Polymerized Polyol (b1)>>

The castor oil polymerized polyol (b1) comprises a castor oil polymerization product. By containing the castor oil polymerized polyol (b1), more excellent effects of improving processability at the time of molding, suppressing an eluted product, and the like are exhibited.

The content of the castor oil polymerization product is preferably 1.0 mass % or more and 35.0 mass % or less, more preferably 2.0 mass % or more and 34.0 mass % or less, and particularly preferably 3.0 mass % or more and 33.0 mass % or less, with respect to the total mass of the polyisocyanate prepolymer (A) and the curing agent (B). When the content is in these ranges, the molding processability of a polyurethane resin and a reduction in elution amount are further excellent.

Note that, the castor oil polymerized polyol (b1) may contain a castor oil polymerization product and castor oil (non-polymerized). Here, the content of the castor oil polymerization product in the castor oil polymerized polyol (b1) can be calculated, for example, by GPC (Gel Permeation Chromatography) measurement while one having a molecular weight of 1500 or more is regarded as a castor oil polymerization product. However, the calculation method of the content of the castor oil polymerization product is not limited thereto, and any method may be used as long as the castor oil polymerization product and the castor oil (non-polymerized) can be distinctively calculated with accuracy.

<<At Least One Polyol (b2) Selected from Group Consisting of Castor Oil and Castor Oil-Modified Polyol>>

The castor oil and the castor oil-modified polyol are not particularly limited.

The castor oil is castor oil itself.

Examples of the castor oil-modified polyol include the same castor oil-modified polyols exemplified in the aforementioned active hydrogen-containing compound (a2).

<<Hydroxyl Group-Containing Amine-Based Compound (b3)>>

The hydroxyl group-containing amine-based compound (b3) is a hydroxyl group-containing amine-based compound other than the castor oil polymerized polyol (b1) and at least one polyol (b2) selected from the group consisting of castor oil, and a castor oil-modified polyol. That is, the hydroxyl group-containing amine-based compound (b3) is a hydroxyl group-containing amine-based compound that does not correspond to any of the castor oil polymerized polyol (b1) and the polyol (b2).

Examples of the hydroxyl group-containing amine-based compound (b3) include amine-based compounds such as alkyldiethanolamine (for example, linear or branched butyldiethanolamine, hexyldiethanolamine, octyldiethanolamine, lauryldiethanolamine, myristyldiethanolamine, cetyldiethanolamine, stearyldiethanolamine, and the like), and amino alcohol derivatives of low-molecular-weight polyamine, low-molecular-weight amino alcohol, and the like (for example, oxyalkylated derivatives of amine compounds such as N,N,N',N'-tetrakis[2-hydroxypropyl]ethylenediamine, N,N,N',N'-tetrakis[2-hydroxyethyl]ethylenediamine that is a propylene oxide or ethylene oxide adduct of ethylenediamine; mono-, di-, triethanolamine; N-methyl-N, N-diethanolamine, and the like).

Among these, a propylene oxide or ethylene oxide adduct of an amine compound such as ethylenediamine is preferred, and N,N,N',N'-tetrakis[2-hydroxypropyl]ethylenediamine is most preferred. By using N,N,N',N'-tetrakis[2-hydroxypropyl]ethylenediamine, more favorable effects of improving processability at the time of molding, reducing an eluted product, and the like are exhibited.

Furthermore, in this aspect, the content of the hydroxyl group-containing amine-based compound (b3) in the curing agent (B) is preferably 30 mass % or less, more preferably 5 mass % or more and 30 mass % or less, and particularly preferably 10 mass % or more and 25 mass % or less. When the content of the hydroxyl group-containing amine-based compound (b3) in the curing agent (B) is 5 mass % or more, the hydroxyl group-containing amine-based compound (b3) exerts more favorably the function of curing promotion and exhibits a more favorable effect. When the ratio of the hydroxyl group-containing amine-based compound (b3) in the curing agent (B) is 30 mass % or less, an excessive increase in reactivity is further suppressed, workability becomes further favorable so as to secure filling properties, and an excessive increase in hardness of a membrane-sealing material to be obtained is further suppressed.

<<Active Hydrogen-Containing Compound (b4)>>

The curing agent (B) may contain an active hydrogen-containing compound (hereinafter, referred to as "active hydrogen-containing compound (b4)") other than the castor oil polymerized polyol (b1), the polyol (b2), and the hydroxyl group-containing amine-based compound (b3). As the active hydrogen-containing compound (b4), various polyols exemplified in the active hydrogen-containing compound (a2) described above can be used.

A mass ratio (Mb2)/(Mb4) of a content Mb2 of at least one polyol (b2) selected from the group consisting of castor oil and a castor oil-modified polyol and a content Mb4 of the active hydrogen-containing compound (b4) in the curing agent (B) is preferably 50/50 or more and 100/0 or less and particularly preferably 100/0. That is, it is particularly preferable that the curing agent (B) is composed of only the castor oil polymerized polyol (b1) and the polyol (b2) or composed of only the castor oil polymerized polyol (b1), the polyol (b2), and the hydroxyl group-containing amine-based compound (b3).

Furthermore, in the case of taking into consideration of the hydroxyl group-containing amine-based compound (b3), when a content of the castor oil polymerized polyol (b1) is designated as Mb1 and a content of the hydroxyl group-containing amine-based compound (b3) is designated as Mb3, a mass ratio (Mb3)/{(Mb1)+(Mb2)} is preferably 5/95 or more and 30/70 or less, and from the viewpoint of curing properties and filling properties, is further preferably 10/90 or more and 25/75 or less.

The hydroxyl value of the curing agent (B) is preferably 50 mgKOH/g or more and 1000 mgKOH/g or less, and from the viewpoint of ease of handleability of the curing agent (B), is more preferably 75 mgKOH/g or more and 750 mgKOH/g or less. From the viewpoint of attaining excellent molding processability and adhesion strength of a polyurethane resin, the hydroxyl value of the curing agent (B) is most preferably 100 mgKOH/g or more and 500 mgKOH/g or less.

The viscosity at 25° C. of the curing agent (B) is preferably 100 mPa·s or more and 6000 mPa·s or less, and from the viewpoint of ease of handleability of the curing agent (B), is more preferably 150 mPa·s or more and 4000 mPa·s or less. From the viewpoint of attaining excellent molding processability of a polyurethane resin, the viscosity at 25° C. of the curing agent (B) is most preferably 200 mPa·s or more and 2000 mPa·s or less.

<Viscosity>

When a viscosity after 60 seconds from a time point at which mixing of the polyisocyanate prepolymer (A) and the curing agent (B) is started is regarded as a mixed viscosity, the mixed viscosity of the polyurethane resin-forming composition for a membrane-sealing material is preferably 400 mPa·s or more and 2100 mPa·s or less and more preferably 500 mPa·s or more and 1800 mPa·s or less.

According to the first aspect of the present disclosure, it is possible to provide a polyurethane resin-forming composition being excellent in moldability, and contributing to formation of a urethane resin that has a suppressed elution amount of a low-molecular-weight reaction product of MDI and glycerin and has excellent appearance, and to provide a sealing material and a membrane module that use the forming composition.

[Second and Third Aspects (Polyurethane Resin-Forming Composition for a Membrane-Sealing Material)]

A polyurethane resin-forming composition for a membrane-sealing material according to a second aspect of the present disclosure comprises:

an allophanate group-containing polyisocyanate prepolymer (A');
a curing agent (B), wherein
the allophanate group-containing polyisocyanate prepolymer (A') comprises a reaction product of
a diphenylmethane diisocyanate (a1-1), and
an active hydrogen-containing compound (a2),
the curing agent (B) comprises a castor oil polymerized polyol (b1),
the castor oil polymerized polyol (b1) comprises a castor oil polymerization product, and
a crosslinking group density is 0.65 mmol/g or more with respect to a total mass of the polyisocyanate prepolymer (A') and the curing agent (B).

A polyurethane resin-forming composition for a membrane-sealing material according to a third aspect of the present disclosure is a polyurethane resin-forming composition for a membrane-sealing material comprising:

an allophanate group-containing polyisocyanate prepolymer (A'); and
a curing agent (B), wherein
the polyisocyanate prepolymer (A') comprises a reaction product of
a diphenylmethane diisocyanate (a1-1), and
an active hydrogen-containing compound (a2),
the curing agent (B) comprises a castor oil polymerized polyol (b1),
the castor oil polymerized polyol (b1) comprises a castor oil polymerization product, and
a content of the castor oil polymerization product is 1 mass % or more and 35 mass % or less with respect to a total amount of the polyisocyanate prepolymer (A') and the curing agent (B).

Hereinafter, the polyurethane resin-forming compositions for a membrane-sealing material according to the second and third aspects will be described, but overlapping descriptions with the polyurethane resin-forming composition for a membrane-sealing material according to the first aspect described above will be omitted.

Note that, in the description of the polyurethane resin-forming composition for a membrane-sealing material according to the first aspect described above, any descriptions can also be applied to the polyurethane resin-forming compositions for a membrane-sealing material according to the second and third aspects, except for description definitely stated as "in this aspect" (that is, in the first aspect).

<Allophanate Group-Containing Polyisocyanate Prepolymer (A')>

The allophanate group-containing polyisocyanate prepolymer (A') comprises a reaction product of
a diphenylmethane diisocyanate (a1-1), and
an active hydrogen-containing compound (a2).

Examples of the MDI (a-1) include those which are the same as in the first aspect described above, and the description thereof will be omitted. However, if it is also allowable to increase the viscosity of the allophanate group-containing polyisocyanate prepolymer (A') to some extent, polymethylene polyphenylene polyisocyanate (polymeric MDI) can also be used as the MDI (a1-1). The content of polymethylene polyphenylene polyisocyanate at this time is preferably 0 mass % or more and 50 mass % or less in the isocyanate component. When the content thereof is 50 mass % or less, the viscosity is sufficiently decreased, and generation of insoluble matters can also be suppressed to a higher degree.

Examples of the active hydrogen-containing compound (a2) include monoalcohols other than those which are the same as in the first aspect described above. Examples of the monoalcohols include aliphatic monoalcohol, aromatic monoalcohol, alicyclic monoalcohol, araliphatic monoalcohol, polyoxypropylene glycol monoalkyl ether, and the like.

Examples of the aliphatic monoalcohol include aliphatic monoalcohols such as methanol, ethanol, 1- and 2-propanol, 1- and 2-butanol, 1-pentanol, 1-hexanol, 2-methyl-1-pentanol, 4-methyl-2-pentanol, 2-ethyl-1-butanol, 1-heptanol, 1-octanol, 2-octanol, 2-ethylhexanol, 3,5-dimethyl-1-hexanol, 2,2,4-trimethyl-1-pentanol, 1-nonanol, 2,6-dimethyl-4-heptanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol, 1-eicosanol, 1-hexacosanol, 1-heptatriacontanol, 1-oleyl alcohol, and 2-octyldodecanol; mixtures of these, and the like.

The number average molecular weight of the aliphatic monoalcohol is preferably 32 or more and 1500 or less and more preferably 100 or more and 1000 or less. When the molecular weight is in this range, the molding processability of a polyurethane resin and adhesion strength are further excellent.

Examples of the aromatic monoalcohol include phenol, cresol, and the like.

Examples of the alicyclic monoalcohol include cyclohexanol, methylcyclohexanol, and the like.

Examples of the araliphatic monoalcohol include benzyl alcohol and the like.

Examples of the polyoxypropylene glycol monoalkyl ether include reaction products of the above-described aliphatic monoalcohol and polyoxypropylene glycol, and include polyoxypropylene methyl ether, polyoxypropylene ethyl ether, polyoxypropylene butyl ether, polyoxypropylene-2-ethylhexyl ether, polyoxypropylene oleyl ether, polyoxypropylene-2-octyldodeca ether, mixtures of these, and the like.

The number average molecular weight of the polyoxypropylene glycol monoalkyl ether is preferably 90 or more and 1500 or less. Note that, from the viewpoint of attaining further excellent molding processability and adhesion strength of a polyurethane resin, the number average molecular weight thereof is more preferably 150 or more and 1000 or less.

Among these, in consideration of compatibility with the curing agent (B), the active hydrogen-containing compound (a2) is preferably an aliphatic alcohol having 10 or more carbon atoms, castor oil, or a castor oil-modified polyol.

<<Formulation of Allophanate Group-Containing Polyisocyanate Prepolymer (A')>>

The allophanate group-containing polyisocyanate prepolymer (A') is preferably obtained, for example, by subjecting the diphenylmethane diisocyanate (a1-1) and the active hydrogen-containing compound (a2) to a urethanation reaction, adding a predetermined amount of a catalyst (a3) to perform allophanation, and stopping the reaction by a catalyst poison (a4).

<<Catalyst (a3)>>

Examples of the catalyst (a3) include zinc acetylacetonate; metal carboxylates of carboxylic acid and zinc, lead, tin, copper, cobalt, and the like, and a mixture thereof; tertiary amine, tertiary amino alcohol, a quaternary ammonium salt, and mixtures of these; and the like.

The amount of the catalyst (a3) added is preferably within a range of 1 ppm or more and 500 ppm or less and more preferably within a range of 5 ppm or more and 300 ppm or less, with respect to the total mass of the diphenylmethane diisocyanate (a1-1) and the active hydrogen-containing compound (a2). When the added amount thereof is 1 ppm or more, the reaction is more rapidly performed, and when the added amount thereof is 500 ppm or less, the coloration of the prepolymer is further favorably suppressed, which is preferred.

<<Active Methylene Compound>>

In the allophanation by tertiary amine or a quaternary ammonium salt in the present disclosure, in a case where the reaction is rapid and is difficult to control, it is effective to add at least one selected from the group consisting of carboxylic acid amide, sulfonic acid amide, and an active methylene compound represented by Formula (1).

[Chemical Formula 1]

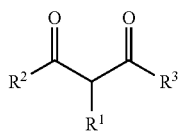

Formula (1)

In the formula, $R^1$ is any one selected from the group consisting of a hydrogen atom, an alkyl group, an alkenyl group, a cycloalkyl group, an arylalkyl group, and an aryl group.

$R^2$ and $R^3$ each independently are any one selected from the group consisting of a hydroxyl group, an alkyl group, an alkenyl group, a cycloalkyl group, an arylalkyl group, an aryl group, an oxyalkyl group, an oxyalkenyl group, an oxycycloalkyl group, an oxyarylalkyl group, and an oxyaryl group.

Examples of the carboxylic acid amide include formamide, acetamide, propionic acid amide, butanoic acid amide, isobutanoic acid amide, hexanoic acid amide, octanoic acid amide, 2-ethylhexanoic acid amide, oleic acid amide, stearic acid amide, benzamide, 2-phenylacetamide, 4-methylbenzamide, 2-aminobenzamide, 3-aminobenzamide, 4-aminobenzamide, mixtures of these, and the like.

Examples of the sulfonic acid amide include methylsulfonamide, butylsulfonamide, t-butylsulfonamide, phenylsulfonamide, benzylsulfonamide, o-toluylsulfonamide, p-toluylsulfonamide, 3-aminophenylsulfonamide, 4-aminophenylsulfonamide, mixtures of these, and the like.

Specific examples of the active methylene compound represented by Formula (1) include acetylacetone, 3-methyl-2,4-pentanedione, 3-ethyl-2,4-pentanedione, 3,5-heptanedione, 3,5-heptanedione, 6-methyl-2,4-heptanedione, methyl acetoacetate, ethyl acetoacetate, methyl 3-oxopentanoate, malonic acid, dimethyl malonate, diethyl malonate, and the like. This active methylene compound may be a mixture obtained by mixing two or more kinds thereof.

Furthermore, the above-described at least one selected from the group consisting of carboxylic acid amide, sulfonic acid amide, and an active methylene compound represented by Formula (1) is preferably added during the period from immediately before catalyst addition to 30 minutes after catalyst addition.

Regarding the temperature at which the allophanation is performed, as the temperature increases, the rate of production of the allophanate group is increased and the viscosity is likely to decrease, but a side reaction such as uretdionization or carbodiimidization is likely to occur. Furthermore, since the amount of an isocyanurate group generated is increased in the reaction at a low temperature so as to increase viscosity, the reaction temperature is preferably 20° C. or higher and 200° C. or lower, and in order to suppress the ratio of an isocyanurate group generated to 20 mol % or less and further reduce viscosity, the reaction temperature is preferably 60° C. or higher and 160° C. or lower.

<<Catalyst Poison (a4)>>

The catalyst poison (a4) is preferably an acidic material. Examples of the catalyst poison (a4) include anhydrous hydrogen chloride, sulfuric acid, phosphoric acid, monoalkyl sulfuric acid ester, alkyl sulfonic acid, alkylbenzene sulfonic acid, mono- or dialkyl phosphoric acid ester, benzoyl chloride, and Lewis acid. The amount of the catalyst poison (a4) added is preferably equivalent or more with respect to the mole number of the catalyst (a3), and is more preferably 1.0-fold molar equivalent or more and 1.5-fold molar equivalents or less of the mole number of the catalyst (a3).

<<Reaction Temperature>>

The urethanation reaction is preferably performed at a temperature range of 40° C. or higher and 80° C. or lower until the NCO content reaches a target NCO content. When the reaction temperature is 40° C. or higher, the crystal precipitation of the monomer MDI can be favorably suppressed, and when the reaction temperature is 80° C. or lower, the generation of a side reaction product can be further suppressed.

The allophanation reaction is preferably performed at a temperature range of 90° C. or higher and 130° C. or lower until the NCO content reaches a target NCO content. When the reaction temperature is 90° C. or higher, the reaction is more rapidly performed, and when the reaction temperature is 130° C. or lower, the generation of a side reaction product can be further suppressed.

<Curing Agent (B)>

The curing agent (B) comprises a castor oil polymerized polyol (b1).

Furthermore, it is preferable that the curing agent (B) comprises
- a castor oil polymerized polyol (b1), and
- at least one polyol (b2) selected from the group consisting of castor oil and a castor oil-modified polyol.

Further, in this aspect, it is more preferable that the curing agent (B) comprises
- a castor oil polymerized polyol (b1), and
- at least one polyol (b2) selected from the group consisting of castor oil and a castor oil-modified polyol, and
- a hydroxyl group-containing amine-based compound (b3) other than the castor oil polymerized polyol (b1) and the polyol (b2); and
- a content of the hydroxyl group-containing amine-based compound (b3) in the curing agent (B) is 35 mass % or less.

In this aspect, the content of the castor oil polymerization product is preferably 1.0 mass % or more and 35.0 mass % or less, more preferably 2.0 mass % or more and 25.0 mass % or less, and particularly preferably 3.0 mass % or more and 15.0 mass % or less, with respect to the total mass of the polyisocyanate prepolymer (A) and the curing agent (B). When the content is in these range, the molding processability of a polyurethane resin and a reduction in elution amount are further excellent.

Furthermore, in this aspect, in the case of containing the hydroxyl group-containing amine-based compound (b3), the content of the hydroxyl group-containing amine-based compound (b3) in the curing agent (B) is preferably 35 mass % or less, more preferably 5 mass % or more and 34 mass % or less, and particularly preferably 10 mass % or more and 33 mass % or less. When the content of the hydroxyl group-containing amine-based compound (b3) in the curing agent (B) is 5 mass % or more, the hydroxyl group-containing amine-based compound (b3) exerts more favorably the function of curing promotion and exhibits a more favorable effect. When the ratio of the hydroxyl group-containing amine-based compound (b3) in the curing agent (B) is 35 mass % or less, an excessive increase in reactivity is further suppressed, workability becomes further favorable so as to secure filling properties, and an excessive increase in hardness of a membrane-sealing material to be obtained is further suppressed.

Further, in this aspect, in the case of containing the active hydrogen-containing compound (b4), the mass ratio (Mb3)/{(Mb1)+(Mb2)} is preferably 5/95 or more and 35/65 or less, and from the viewpoint of curing properties and filling properties, is further preferably 10/90 or more and 33/67 or less.

<Crosslinking Group Density>

In order to suppress the elution amount in a solvent, the crosslinking group density of the polyurethane resin-forming composition for a membrane-sealing material is preferably 0.65 mmol/g or more, more preferably 0.70 mmol/g or more, and particularly preferably 0.75 mmol/g or more and 1.20 or less, with respect to the total mass of the polyisocyanate prepolymer (A') and the curing agent (B). When the crosslinking group density is 1.20 or less, molding processability becomes more favorable.

Note that, the crosslinking group density means the total content density of a group that may form cross-linkage and a group that has already formed cross-linkage.

Therefore, when description is given for a trifunctional polyol (for example, glycerin) as an example, one hydroxyl group in one molecule forms cross-linkage, and the remaining two hydroxyl groups do not contribute to cross-linkage. Thus, in this case, the number of crosslinking groups is one. That is, in the case of a polyurethane resin-forming composition for a membrane-sealing material comprising a trifunctional polyol, the content of the crosslinking group derived from the trifunctional polyol has the same meaning as the content of the trifunctional polyol since the trifunctional polyol has one crosslinking group.

According to second and third aspects of the present disclosure, it is possible to provide a polyurethane resin-forming composition contributing to formation of a urethane resin that has a low viscosity, is excellent in cast moldability, and has a reduced water elution amount of a low-molecular-weight reaction product of diphenylmethane diisocyanate and glycerin and a reduced solvent elution amount of a molded product and to provide a membrane-sealing material and a membrane module that use the forming composition.

<Membrane-Sealing Material>

The membrane-sealing material according to one aspect of the present disclosure comprises a cured product of the aforementioned polyurethane resin-forming composition for a membrane-sealing material.

The membrane-sealing material can be more suitably formed by reacting and curing an isocyanate component constituting the above-described polyisocyanate prepolymer (A) and a polyol component constituting the above-described curing agent (B) under a temperature condition of 0° C. or higher and 100° C. or lower, preferably 20° C. or higher and 80° C. or lower, and further preferably 30° C. or higher and 60° C. or lower. The gelation time can be shortened by molding the membrane-sealing material at a high temperature range, but mold shrinkage is likely to occur. Thus, mold shrinkage can also be suppressed by adding a catalyst to lower the reaction temperature.

<Membrane Module>

A membrane module according to one aspect of the present disclosure includes:
- a main body unit;
- a membrane; and
- a membrane-sealing material sealing a gap between the main body unit and the membrane, wherein
- the membrane-sealing material is the membrane-sealing material described above.

Next, a membrane module according to one aspect of the present disclosure will be more specifically described with reference to the drawing.

FIG. 1 is a conceptual diagram illustrating an example of a configuration of a membrane module according to one aspect of the present disclosure.

A membrane module (hollow fiber membrane module) 100 illustrated in FIG. 1 includes a housing (main body unit) 11 and the inside thereof is filled with a plurality of hollow fiber membranes (membranes) 13. For example, in the case of a hollow fiber membrane module to be used as a dialyzer, the inside thereof is filled with several thousands to several tens of thousands of hollow fiber membranes.

The housing 11 has a cylindrical shape. A membrane-sealing material 19 is provided at each of both ends (both right and left ends in FIG. 1) inside the housing 11. The membrane-sealing material embeds a gap between the hollow fiber membranes 13 and a gap between the hollow fiber membrane 13 and the inner wall of the housing 11 so as to seal the gaps, and unites the plurality of hollow fiber membranes 13.

Furthermore, a first fluid inlet 15 and a first fluid outlet 17 are provided on the side surfaces of the housing 11, and a first fluid (gas or liquid) flows in or out inside the housing 11 therethrough. The first fluid flowing in from the first fluid inlet 15 passes through the gap (hollow fiber membrane outer part) while being in contact with the plurality of hollow fiber membranes 13 filled in the housing 11 and is discharged from the first fluid outlet 17. Note that, since the membrane-sealing material 19 does not exist inside the hollow fiber membrane 13, a second fluid (gas or liquid) flows in or out inside the hollow fiber membrane 13 through a second inlet (one end side) and a second outlet (the other end side) provided in a cap member (not illustrated). Further, by the first fluid and the second fluid being in contact with each other through the hollow fiber membrane 13, material transfer from one fluid into the other fluid (or from still another fluid into the one fluid) occurs. For example, in the case of a hollow fiber membrane-type dialyzer, by dialysis fluid and blood being into contact with each other, a waste material or excessive moisture content in the blood transfers to the dialysis fluid.

Note that, a membrane module 100 illustrated in FIG. 1 includes the plurality of hollow fiber membranes 13 and has a configuration in which the membrane-sealing material 19 seals the gap in both ends thereof, but the membrane module according to this aspect is not limited to this configuration at all. For example, the membrane module may be configured as a plurality of membranes or a single membrane having various shapes such as a flat membrane and a spiral membrane. Furthermore, the membrane-sealing material is not limited to the configuration in which the membrane-sealing material is provided at both ends of the membrane, and the membrane-sealing material may be provided only at a portion of the membrane (one end in the case of a hollow fiber shape) or all of ends of the membrane, for example, all of outer edges of the flat membrane. Further, the sealing material may be configured to be provided at a portion of the membrane other than the end portion and to seal the part. Furthermore, the housing 11 of the membrane module 100 illustrated in FIG. 1 has a cylindrical shape, but may have any shapes other than the cylindrical shape.

In the membrane module 100, the gap between the hollow fiber membranes 13 at the end portions of a converging body of the plurality of hollow fiber membranes 13 is sealed by the above-described polyurethane resin-forming composition for a membrane-sealing material, and this composition is cured so as to form the above-described membrane-sealing material (the gap between the hollow fiber membranes is sealed by this membrane-sealing material).

The membrane module according to one aspect of the present disclosure can be suitably used as a module for medical use or water treatment since the elution amount is satisfactorily reduced. Specific examples of the membrane module a plasma separation device, an artificial lung, an artificial kidney, artificial liver, and water treatment devices for household use/industrial use.

Hereinafter, embodiments of the present disclosure are described in the following [1] to [11].

[1]: A polyurethane resin-forming composition for a membrane-sealing material comprising:
  a polyisocyanate prepolymer (A); and
  a curing agent (B), wherein
  the polyisocyanate prepolymer (A) comprises a reaction product of
    a diphenylmethane diisocyanate (a1-1) and/or a modified product of a diphenylmethane diisocyanate (a1-2), and
    an active hydrogen-containing compound (a2),
  the curing agent (B) comprises a castor oil polymerized polyol (b1),
  the castor oil polymerized polyol (b1) comprises a castor oil polymerization product, and
  a content of the castor oil polymerization product is 1 mass % or more and 35 mass % or less with respect to a total amount of the polyisocyanate prepolymer (A) and the curing agent (B).

[2]: The polyurethane resin-forming composition for a membrane-sealing material described in [1], wherein
  the curing agent (B) comprises
    a castor oil polymerized polyol (b1),
    at least one polyol (b2) selected from the group consisting of castor oil and a castor oil-modified polyol, and
    a hydroxyl group-containing amine-based compound (b3) other than the castor oil polymerized polyol (b1) and the polyol (b2), and
  a content of the hydroxyl group-containing amine-based compound (b3) in the curing agent (B) is 30 mass % or less.

[3]: A polyurethane resin-forming composition for a membrane-sealing material, containing:
  an allophanate group-containing polyisocyanate prepolymer (A'); and
  a curing agent (B), wherein
  the allophanate group-containing polyisocyanate prepolymer (A') comprises a reaction product of
    a diphenylmethane diisocyanate (a1-1), and
    an active hydrogen-containing compound (a2),
  the curing agent (B) comprises a castor oil polymerized polyol (b1),
  the castor oil polymerized polyol (b1) comprises a castor oil polymerization product, and
  a crosslinking group density of the polyurethane resin-forming composition for a membrane-sealing material is 0.65 mmol/g or more with respect to a total mass of the allophanate group-containing polyisocyanate prepolymer (A') and the curing agent (B).

[4]: The polyurethane resin-forming composition for a membrane-sealing material described in [3], wherein a content of the castor oil polymerization product is 1 mass % or more and 35 mass % or less with respect to a total amount of the allophanate group-containing polyisocyanate prepolymer (A') and the curing agent (B).

[5]: A polyurethane resin-forming composition for a membrane-sealing material, containing:
  an allophanate group-containing polyisocyanate prepolymer (A'); and
  a curing agent (B), wherein
  the allophanate group-containing polyisocyanate prepolymer (A') comprises a reaction product of
    a diphenylmethane diisocyanate (a1-1), and
    an active hydrogen-containing compound (a2),
  the curing agent (B) comprises a castor oil polymerized polyol (b1), the castor oil polymerized polyol (b1) comprises a castor oil polymerization product, and a content of the castor oil polymerization product is 1 mass % or more and 35 mass % or less with respect to a total amount of the allophanate group-containing polyisocyanate prepolymer (A') and the curing agent (B).

[6]: The polyurethane resin-forming composition for a membrane-sealing material described in any one of [3] to [5], wherein the curing agent (B) comprises
a castor oil polymerized polyol (b1),
at least one polyol (b2) selected from the group consisting of castor oil and a castor oil-modified polyol, and
a hydroxyl group-containing amine-based compound (b3) other than the castor oil polymerized polyol (b1) and the polyol (b2), and
a content of the hydroxyl group-containing amine-based compound (b3) in the curing agent (B) is 35 mass % or less.

[7]: The polyurethane resin-forming composition for a membrane-sealing material described in [1], [3], [4], [5], or [6], wherein the curing agent (B) comprises
a castor oil polymerized polyol (b1), and
at least one polyol (b2) selected from the group consisting of castor oil and a castor oil-modified polyol.

[8]: A membrane-sealing material comprising a cured product of the polyurethane resin-forming composition for a membrane-sealing material described in any one of [1] to [7].

[9]: A membrane module including:
a main body unit;
a membrane; and
a membrane-sealing material sealing a gap between the main body unit and the membrane, wherein
the membrane-sealing material is the membrane-sealing material described in [8].

[10]: The membrane module described in [9], wherein
the membrane is a plurality of hollow fiber membranes, and
the membrane-sealing material seals
a gap between the main body unit and at least a portion of the plurality of hollow fiber membranes, and
at least a portion of a mutual gap between the plurality of hollow fiber membranes.

EXAMPLES

The present invention will be more specifically described below by means of Examples and Comparative Examples. However, the present invention is not construed as being limited to these Examples at all. Note that, hereinafter, "%" means "mass %" unless otherwise specified.

The following components were used in Examples and Comparative Examples.

[Polyisocyanate prepolymer (A)]
a1-1; 4,4'-MDI (manufactured by Tosoh Corporation, product name MILLIONATE MT, isocyanate group content=33.6%)
a1-2; Mixture of 2,4'-MDI and 4,4'-MDI (manufactured by Tosoh Corporation, product name MILLIONATE NM, isocyanate group content=33.6%)
a1-3; Carbodiimide-modified product of 4,4'-MDI (manufactured by Tosoh Corporation, product name MILLIONATE MTL-C, isocyanate group content=28.6%)
a1-4; Carbodiimide-modified product of 4,4'-MDI (manufactured by Tosoh Corporation, product name MILLIONATE MTL, isocyanate group content=29.0%, crosslinking group density=0.45 mmoUg)
a2-1; Castor oil fatty acid methyl ester (manufactured by ITOH OIL CHEMICALS CO., LTD., product name COFA-MD, OHV=160 mgKOH/g)
a2-2; Polypropylene glycol (manufactured by ADEKA Corporation, product name PP-1000, OHV=111 mgKOH/g)
a2-3; Isotridecanol (manufactured by KH Neochem Co., Ltd., OHV=275 mgKOH/g)
a2-4; 2-Octyl dodecanol (manufactured by Kao Corporation, product name KALCOL 200GD, hydroxyl value=185 mgKOH/g)
a2-5; Castor oil (manufactured by ITOH OIL CHEMICALS CO., LTD., product name URIC H-30, OHV=160 mgKOH/g, viscosity (25° C.)=690 mPa·s, content of castor oil polymerization product having a number average molecular weight of 1500 or more=1% or less, crosslinking group density=0.74 mmol/g)
a3-1; Zinc acetylacetonate (manufactured by Tokyo Chemical Industry Co., Ltd.)
a3-2; 2-[{2-(Dimethylamino)ethyl}methylamino]ethanol (manufactured by Tosoh Corporation product name TOYOCAT RX5)
Active methylene compound; Diethyl malonate (manufactured by Tokyo Chemical Industry Co., Ltd.)
a4; Benzoyl chloride (manufactured by Tokyo Chemical Industry Co., Ltd.)

[Curing Agent (B)]
b1-1; Castor oil polymerization product (manufactured by ITOH OIL CHEMICALS CO., LTD., product name Polycaster #30, OHV=155 mgKOH/g, viscosity (25° C.)=4800 mPa·s, content of castor oil polymerization product having a number average molecular weight of 1500 or more=about 54%, crosslinking group density 1.84 mmol/g)
b1-2; Castor oil polymerization product (manufactured by ITOH OIL CHEMICALS CO., LTD., product name Polycaster #10, OHV=160 mgKOH/g, viscosity (25° C.)=2600 mPa·s, content of castor oil polymerization product having a number average molecular weight of 1500 or more=about 43%)
b1-3; Castor oil polymerization product
(castor oil polymerization product obtained in Synthesis Example 1 of castor oil polymerization product described below, OHV=155 mgKOH/g, viscosity (25° C.)=8000 mPa·s, content of castor oil polymerization product having a number average molecular weight of 1500 or more=about 65%)
b2-1; Castor oil (manufactured by ITOH OIL CHEMICALS CO., LTD., product name URIC H-30, OHV=160 mgKOH/g, viscosity (25° C.)=690 mPa·s, content of castor oil polymerization product having a number average molecular weight of 1500 or more=1% or less)
b2-2; Esterification product of castor oil fatty acid and polypropylene glycol
(esterification product obtained in Synthesis Example 1 of diol described below, OHV=114 mgKOH/g)

b2-3; Partially dehydrated castor oil (manufactured by ITOH OIL CHEMICALS CO., LTD. #1740U, OHV=120 mgKOH/g, crosslinking group density=0 mmol/g)

b3-1; N,N,N',N'-Tetrakis[2-hydroxypropyl]ethylenediamine (manufactured by ADEKA Corporation, product name EDP-300, OHV=760 mgKOH/g, viscosity (25° C.)=50000 mPa·s, crosslinking group density=2.63 mmol/g)

b3-2; Ethylene oxide of ethylenediamine/propylene oxide=4/6 mass ratio adduct (manufactured by ADEKA Corporation, product name BM-34, OHV=820 mgKOH/g, viscosity (25° C.)=7500 mPa·s)

b3-3; N-Lauryl diethanolamine (manufactured by Kao Corporation, product name AMIET 102, OHV=394 mgKOH/g, viscosity (25° C.)=100 mPa·s)

Synthesis Example 1 of Castor Oil Polymerization Product

To a 2 L four-neck flask equipped with a stirrer, a thermometer, a heater, and a dripping funnel, 1000 parts by mass of castor oil (manufactured by ITOH OIL CHEMICALS CO., LTD., product name URIC H-30) was added and heated to 140° C. in a nitrogen flow. While a nitrogen gas was blown, 160 parts by mass of t-butyl peroxide was added dropwise over 30 minutes, heated to 150° C., and reacted for 4 hours. Thereafter, the decomposed product was collected under reduced pressure for 1 hour and filtered and purified at 120° C. by adding white clay, thereby obtaining a castor oil polymerization product. The hydroxyl value of the obtained castor oil polymerization product was 155 mgKOH/g.

Synthesis Example 1 of Diol

To a 1 L four-neck flask equipped with a stirrer, a thermometer, a heater, and a distillation column, 596 parts by mass of ricinolic acid (manufactured by ITOH OIL CHEMICALS CO., LTD., product name CO-FA) and 400 parts by mass of polypropylene glycol having a number average molecular weight of 400 (manufactured by ADEKA Corporation, product name P-400) were added, heated to 190° C. in a nitrogen flow while heated for 2 hours at 110° C. at a rate of 10° C./hr, and further reacted for 2 hours at 190° C., and water was distilled away. Next, 0.05 parts by mass of tetrabutyl titanate (manufactured by KATAYAMA CHEMICAL INDUSTRIES Co., Ltd., product name TBT-100) was added to stop the supply of nitrogen, the pressure was gradually reduced to 5 kPa while the temperature was maintained at 190° C., and after the pressure reached 5 kPa, the reaction was further performed for 4 hours to distill away water, thereby obtaining a target esterification product. The hydroxyl value of the obtained esterification product was 114 mgKOH/g.

Production Examples 1 to 5 of Prepolymer (A)

Respective raw materials for a1 and b2 were charged according to the blending ratio shown in Table 1 and stirred and mixed for 3 hours at 70° C. so as to be reacted, thereby synthesizing prepolymers A-1 to 5. The properties thereof are shown in Table 1.

TABLE 1

| | Base agent | Production Example 1 A-1 | Production Example 2 A-2 | Production Example 3 A-3 | Production Example 4 A-4 | Production Example 5 A-5 |
|---|---|---|---|---|---|---|
| Composition | a1-1 (g) | 200 | — | 300 | — | — |
| | a1-2 (g) | — | 600 | 300 | — | 1000 |
| | a1-3 (g) | 410 | — | — | — | — |
| | a1-4 (g) | — | — | — | 1000 | — |
| | b2-1 (g) | — | 400 | 400 | — | — |
| | b2-2 (g) | 390 | — | — | — | — |
| Properties | NCO content (%) | 15.1 | 15.2 | 15.2 | 28.6 | 33.6 |
| | MDI monomer content (%) | 32.6 | 34.1 | 34.1 | 75.0 | 100.0 |
| | Urethane group concentration (mmol/g) | 0.79 | 1.14 | 1.14 | 0.00 | 0.00 |
| | Viscosity (mPa · s; 25° C.) | 2400 | 3800 | 3750 | SO | 20 |

Preparation Examples 1 to 12 of Curing Agent (B)

Respective raw materials for b1, b2, and b3 were charged according to the blending ratio shown in Table 2 and stirred and uniformly mixed, thereby obtaining Preparation Examples 1 to 12. The properties thereof are shown in Table 2.

TABLE 2

| | Curing agent | Preparation Example 1 B-1 | Preparation Example 2 B-2 | Preparation Example 3 B-3 | Preparation Example 4 B-4 | Preparation Example 5 B-5 | Preparation Example 6 B-6 |
|---|---|---|---|---|---|---|---|
| Composition | b1-1 (pars by mass) | 100 | — | — | 40 | — | 20 |
| | b1-2 (pars by mass) | — | — | — | — | 40 | — |

TABLE 2-continued

|  |  | | | | | | |
|---|---|---|---|---|---|---|---|
|  | b1-3 (pars by mass) | — | — | 100 | — | — | — |
|  | b2-1 (pars by mass) | — | 100 | — | 40 | 40 | 54 |
|  | b3-1 (pars by mass) | — | — | — | 20 | 20 | 16 |
|  | b3-2 (pars by mass) | — | — | — | — | — | — |
|  | b3-3 (pars by mass) | — | — | — | — | — | 10 |
| Properties | Viscosity (mPa·s; 25° C.) | 4800 | 690 | 8000 | 2600 | 1800 | 1650 |
|  | Hydroxyl value (KOHmg/g) | 155 | 160 | 155 | 278 | 280 | 278 |
|  | Castor oil polymerization product content (%) | 54.0 | 0.0 | 65.0 | 21.6 | 17.2 | 10.8 |

| | Curing agent | Preparation Example 7 B-7 | Preparation Example 8 B-8 | Preparation Example 9 B-9 | Preparation Example 10 B-10 | Preparation Example 11 B-11 | Preparation Example 12 B-12 |
|---|---|---|---|---|---|---|---|
| Composition | b1-1 (pars by mass) | — | 39 | — | 38 | — | 43 |
|  | b1-2 (pars by mass) | — | — | — | — | — | — |
|  | b1-3 (pars by mass) | — | — | — | — | — | — |
|  | b2-1 (pars by mass) | 80 | 39 | 78 | 38 | 76 | 43 |
|  | b3-1 (pars by mass) | 20 | 17 | 17 | 24 | 24 | 14 |
|  | b3-2 (pars by mass) | — | 5 | 5 | — | — | — |
|  | b3-3 (pars by mass) | — | — | — | — | — | — |
| Properties | Viscosity (mPa·s; 25° C.) | 1150 | 2670 | 1240 | 2750 | 1300 | 2400 |
|  | Hydroxyl value (KOHmg/g) | 280 | 293 | 295 | 302 | 304 | 242 |
|  | Castor oil polymerization product content (%) | 0.0 | 21.1 | 0.0 | 20.5 | 0.0 | 23.2 |

Examples 1 to 6 and Comparative Examples 1 to 9

Urethane resin compositions having the compositions shown in Table 3 and Table 4 were molded.

Values described in Table 3 and Table 4 were calculated from the following test results.

[NCO Content Measurement]

In the prepolymers A-1 to A-5 shown in Table 1, the NCO content was measured according to JIS K1603-1:2007.

[Content Measurement of MDI Monomer]

In the prepolymers A-1 to A-5 shown in Table 1, the content (mass %) of the MDI monomer was obtained by GPC (Gel Permeation Chromatography) measurement using the following conditions and method.

<GPC Measurement Conditions of Isocyanate Prepolymer>
(1) Measurement device: "HLC-8120 (trade name)" (manufactured by Tosoh Corporation)
(2) Column temperature: 40° C.
(3) Detector: RI (refractive index)
(4) Column: Measurement was performed by connecting in series columns filled with each of three kinds of TSKgel G3000HXL, TSKgel G2000HXL, and TSKgel G1000HXL (all of these being trade names, manufactured by Tosoh Corporation) as a filler.
(5) Eluent: tetrahydrofuran (THF) (flow rate: 1 mL/min., 40° C.)
(6) Calibration curve: A calibration curve was obtained polystyrene (TSK standard POLYSTYRENE) having the following grade. F-2 ($1.81 \times 10^4$) F-1 ($1.02 \times 10^4$) A-5000 ($5.97 \times 10^3$) A-2500 ($2.63 \times 10^3$) A-500 (Mw=$6.82 \times 10^2$, $5.78 \times 10^2$, $4.74 \times 10^2$, $3.70 \times 10^2$, $2.66 \times 10^2$) toluene (Mw=92)
(7) Sample: THF 10 mL solution of 0.05 g of sample <Measurement Conditions>

First, a calibration curve was obtained from the chart prepared by detecting the difference between refractive indices using polystyrene as a standard material. Next, regarding each sample, mass percentage of the peak near a peak top molecular weight (number average molecular weight) of 230 indicating the MDI monomer was obtained from the chart prepared by detecting the difference between refractive indices on the basis of the same calibration curve. The obtained value was regarded as the content (%) of the MDI monomer.

[Castor Oil Polymerization Product Content Measurement]

In curing agents (B-1) to (B-12) shown in Table 2, the castor oil polymerization product content (mass %) was obtained by GPC measurement using the following conditions and method.

<GPC Measurement Conditions of Curing Agent>
(1) Measurement device: "HLC-8120 (trade name)" (manufactured by Tosoh Corporation)

(2) Column: Four columns filled with each of two kinds of TSKgel G2000HXL and TSKgel G3000HXL (all of these being trade names, manufactured by Tosoh Corporation) as a filler were connected in series.
(3) Column temperature: 40° C.
(4) Detector: RI (refractive index)
(5) Eluent: tetrahydrofuran (THF) (flow rate: 1 mL/min., 40° C.)
(6) Calibration curve: A calibration curve was obtained by using trifunctional polypropylene polyols of the following trade names (all of there being manufactured by Sanyo Chemical Industries, Ltd.).

"SANNIX GP-250" (number average molecular weight=250)
"SANNIX GP-400" (number average molecular weight=400)
"SANNIX GP-600" (number average molecular weight=600)
"SANNIX GP-1000" (number average molecular weight=1000)
"SANNIX GP-3000" (number average molecular weight=3000)
"SANNIX GP-4000" (number average molecular weight=4000)
"SANNIX GP-5000" (number average molecular weight=5000)

(7) Sample solution: THF 10 mL solution of 0.05 g of sample

<Measurement Conditions>

First, a calibration curve was obtained from the chart prepared by detecting the difference between refractive indices using polystyrene as a standard material. Next, regarding each sample, mass percentage of the peak near a peak top molecular weight of 1000 indicating the purified castor oil was obtained from the chart prepared by detecting the difference between refractive indices on the basis of the same calibration curve. The peak other than the purified castor oil was a molecular weight of 1500 or more, and mass percentage other than the mass percentage of the purified castor oil was obtained as the mass percentage of the castor oil polymerization product. That is, mass percentage other than the purified castor oil was obtained as the mass percentage of the castor oil polymerization product.

[Production of Sample for Low-Molecular-Weight Elution Test]

Examples 1 to 6 and Comparative Examples 1 to 9

A base agent and a curing agent were blended as combinations of base agents (A-1) to (A-5) and curing agents (B-1) to (B-12) shown in Table 3 and Table 4 under the conditions of a liquid temperature of 45° C. and an isocyanate group/an active hydrogen group=1.00 or 1.05 (molar ratio) so that the total mass became 30 g, thereby producing a mixed liquid. Then, the obtained mixed liquid was stirred for 15 seconds. 10 g of glycerin was further added (assuming glycerin contained in the hollow fiber) and stirred for 15 seconds, thereby obtaining a polyurethane resin cured product. This resin cured product was left to stand still under the primary curing conditions of a temperature of 50° C. and a time of 10 minutes and under the secondary curing conditions of a temperature of 45° C. and a time of 2 hours.

[Low-Molecular-Weight Eluted Product Extraction Test]

The low-molecular-weight eluted product values of the resin cured products obtained in Examples 1 to 6 and Comparative Examples 1 to 9 were measured by the following method.

First, 20 g of each of those, which were obtained by cutting the low-molecular-weight eluted product value measurement sample obtained in each of Examples and Comparative Examples into a fan shape, was weighed, immersed in 100 ml of purified water previously heated to 40° C., and left to stand still for 2 hours at 40° C., and a low-molecular-weight eluted product was extracted in purified water. Next, the obtained extraction liquid was decanted, 10 ml thereof was put in a 50 ml measuring flask, and a liquid adjusted to 50 ml with purified water was used as a test liquid. Then, the UV absorbance measurement (manufactured by SHIMADZU CORPORATION, product name UV-1500) of the test liquid was performed. A value of $\frac{1}{10}$ of the maximum value of the absorbance at 240 to 245 nm was regarded as the low-molecular-weight eluted product value. The low-molecular-weight eluted product value is preferably less than 0.07 and more preferably less than 0.065.

[Mixed Viscosity•Pot Life Test]

In Examples 1 to 6 and Comparative Examples 1 to 9, the mixed viscosity and the pot life at the time of obtaining a resin cured product were obtained by the following methods.

The base agent and the curing agent whose temperature was adjusted in advance to 45° C. were measured so that the total amount was 50 g based on blending of the isocyanate group/the active hydrogen group=1.00 (molar ratio), and mixed so as to obtain a mixture. Next, the viscosity of the mixture was measured under 25° C. atmosphere by using a rotating viscometer (B type, No. 4 rotor). A viscosity after 60 seconds from a time point at which mixing of the base agent and the curing agent was started was regarded as a mixed viscosity, and a time until the viscosity of the mixture reached 50000 mPa·s was regarded as a pot life (sec). When the mixed viscosity was 1800 mPa·s or less, the filling properties were determined as good, and when the pot life was within 300 seconds, rapid curing properties were determined as good.

[Hardness Measurement Test]

The hardness of the resin cured products obtained in Examples 1 to 6 and Comparative Examples 1 to s were measured by the following method.

The JIS-D hardnesses at the measurement moment and after 10 seconds from the measurement moment of a measurement sample obtained in each of Examples and Comparative Examples were measured under a temperature condition of 25° C. by the method based on the method described in JIS-K7312.

[Appearance Evaluation]

Each of polyurethane resin-forming composition for a membrane-sealing materials obtained by combinations shown in Table 3 and Table 4 was degassed under reduced pressure for 3 minutes at 10 to 20 kPa and then poured into a stainless steel mold (100 mm×100 mm×8 mm). This was left to stand still and cured for 2 days at 45° C. and then released from the mold, thereby obtaining a cured product. The appearance of the obtained cured product was visually evaluated. A case where there is no turbidity was evaluated as "A", a case where there is slightly turbidity or the insufficiency of curing is recognized was evaluated as "B", and a case where there is white turbidity was evaluated as "C".

[Brightness Evaluation]

The brightness of the cured product used in the appearance evaluation was measured. Results are shown in Table 3 and Table 4. Note that, the brightness was measured according to JIS-P8123. The brightness is preferably 7.0 or less and more preferably 5.0 or less.

[Hardness Evaluation]

The Shore D hardness at 25° C. of the cured product used in the appearance evaluation was measured. Results are shown in Table 3 and Table 4. Note that, the hardness was measured according to JIS K 7312:1996.

[Mold Shrinkage Ratio]

Each of polyurethane resin-forming composition for a membrane-sealing materials obtained by combinations shown in Table 3 and Table 4 was degassed under reduced pressure for 1 minute at 10 to 20 kPa and then poured into a stainless steel ring mold (about φ60 mm×10 mmH). This was primarily cured for 1 hour at 45° C. Subsequently, secondary curing was performed at 25° C.×2 days, the ring size was regarded as an initial value, and then the shrinkage ratio was measured.

Shrinkage ratio (%)=[(Stainless steel ring inner diameter)−(Cured product outer diameter)]/ (Stainless steel ring inner diameter)×100   [Mathematical Formula 1]

TABLE 3

|  |  | Example 1 | Example 2 | Example 3 | Example 4 | Example 5 | Example 6 |
|---|---|---|---|---|---|---|---|
|  | Base agent | A-1 | A-1 | A-1 | A-1 | A-2 | A-3 |
|  | Curing agent | B-1 | B-4 | B-5 | B-6 | B-8 | B-10 |
|  | Base agent/curing agent (molar ratio) | 1.00 | 1.00 | 1.00 | 1.00 | 1.00 | 1.00 |
|  | Urethane group concentration (mmol/g) of base agent | 0.79 | 0.79 | 0.79 | 0.79 | 1.14 | 1.14 |
| In system | Monomer MDI (%) | 14.4 | 18.9 | 19.0 | 18.9 | 20.2 | 20.4 |
|  | Castor oil polymerization product content (%) | 30.5 | 9.1 | 7.2 | 4.5 | 8.6 | 8.2 |
|  | Low-molecular-weight eluted product value | 0.027 | 0.062 | 0.065 | 0.054 | 0.060 | 0.061 |
|  | Mixed viscosity (mPa · s) | 1580 | 1560 | 1330 | 1310 | 1640 | 1760 |
|  | Pot life | 1033 | 209 | 221 | 201 | 211 | 198 |
|  | Hardness (D hardness) momentary value | 41 | 68 | 67 | 63 | 66 | 66 |
|  | Mold shrinkage ratio (%, 45° C. × 1 hr + 25° C. × 2 days) | 0.4 | 0.8 | 0.7 | 0.7 | 0.8 | 0.9 |
|  | Brightness | 2.1 | 2.7 | 2.5 | 1.9 | 1.9 | 2.1 |
|  | Molded product appearance | A | A | A | A | A | A |

TABLE 4

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Base agent | A-1 | A-1 | A-1 | A-2 | A-3 | A-4 | A-4 | A-4 | A-5 |
| Curing agent | B-2 | B-3 | B-7 | B-9 | B-11 | B-1 | B-2 | B-12 | B-9 |
| Base agent/curing agent (molar ratio) | 1.00 | 1.00 | 1.00 | 1.00 | 1.00 | 1.05 | 1.05 | 1.00 | 1.00 |
| Urethane group concentration (mmol/g) of base agent | 0.79 | 0.79 | 0.79 | 1.14 | 0.57 | 0.0 | 0.0 | 0.0 | 0.0 |
| In system Monomer MDI (%) | 14.4 | 14.3 | 19.0 | 20.2 | 30.3 | 23.0 | 23.4 | 27.6 | 40.1 |
| Castor oil polymerization product content (%) | 0.0 | 36.5 | 0.0 | 0.0 | 0.0 | 36.7 | 0.00 | 14.3 | 0.00 |
| Low-molecular-weight eluted product value | 0.053 | 0.026 | 0.075 | 0.072 | 0.072 | 0.051 | 0.177 | 0.148 | 0.223 |
| Mixed viscosity (mPa · s) | 390 | 2530 | 1180 | 1280 | 1380 | 740 | 200 | 400 | 230 |
| Pot life | 4686 | 891 | 230 | 228 | 212 | 607 | 2880 | 191 | 135 |
| Hardness (D hardness) momentary value | 17 | 46 | 60 | 58 | 59 | 48 | 30 | 78 | 72 |
| Mold shrinkage ratio (%, 45° C. × 1 hr + 25° C. × 2 days) | ※1 | 1.1 | 0.6 | 0.6 | 0.7 | 0.6 | ※1 | 0.8 | 1.0 |
| Brightness | 2.1 | 3.5 | 2.1 | 1.8 | 1.4 | 9.8 | 5.9 | 11.4 | 7.4 |
| Molded product appearance | B | A | A | A | A | C | A | C | B |

※1 Unmeasurable due to the insufficiency of curing

Production Examples 1 to 8

(Production Example 1: Production of Base Agent (A-9))

To a 2 L four-neck flask, 193 g of a1-1 and 450 g of a1-2 were added and the temperature of the resultant mixture was adjusted to 50° C. while the resultant mixture was stirred in a nitrogen flow. Next, 269 g of a2-1 and 88 g of a2-2 were added under stirring, and the resultant mixture was heated to 90° C. after the heat generation of the urethanation reaction has subsided. After the internal temperature was stabilized to 90° C., 0.1 g of a catalyst a3-1 was added and reacted for 4 hours at 90° C., and 0.14 g of a catalyst poison a4 was added so as to stop the reaction, thereby obtaining an isocyanate group-terminated prepolymer. Hereinafter, this isocyanate group-terminated prepolymer is referred to as "base agent (A-9)". In the base agent (A-9), the isocyanate group (NCO) content in the obtained isocyanate group-terminated prepolymer was 13.5 mass %, and the viscosity at 25° C. was 3330 mPa·s.

Production Examples 10 and 12 to 14

A prepolymer was synthesized in the same operation as in Production Example 1 by changing the isocyanate component and the polyol component to the composition shown in Table 5. In any cases, prepolymers, which were pale yellow transparent liquids and had a low viscosity, were obtained. Hereinafter, these prepolymers are referred to as base agents (A-10) and (A-12) to (A-14). Furthermore, the properties of the base agents (A-10) and (A-12) to (A-14) are shown in Table 5.

Production Example 3

Production Example 3: Production of Base Agent (A-11)

To a 2 L four-neck flask, 231 g of a1-1 and 538 g of a1-2 were added and the temperature of the resultant mixture was adjusted to 50° C. while the resultant mixture was stirred in a nitrogen flow. Next, 231 g of a2-3 was added under stirring, and the resultant mixture was heated to 110° C. after the heat generation of the urethanation reaction has subsided. After the internal temperature was stabilized to 110° C., an active methylene compound and a catalyst a3-2 were sequentially added in predetermined amounts (see the numerical values in the table), and the allophanation reaction was started. The reaction was followed while the internal fluid was sampled and the NCO content was measured, and a predetermined amount (see the numerical value in the table) of the catalyst poison a4 was added at the time point at which the NCO content was expected to reach 16.1% so as to stop the reaction, thereby obtaining a polyisocyanate composition comprising an allophanate modified product. Hereinafter, this polyisocyanate composition is referred to as "base agent (A-11)". The base agent (A-11) was a pale yellow transparent liquid and the viscosity at 25° C. was 3630 mPa·s.

Production Example 7: Production of Base Agent (A-15)

To a 1 L four-neck flask, 300 g of a1-1 and 300 g of a1-2 were added and the temperature of the resultant mixture was adjusted to 50° C. while the resultant mixture was stirred in a nitrogen flow. Next, 400 g of a2-5 was added under stirring, and the resultant mixture was reacted for 3 hours at 75° C. after the heat generation of the urethanation reaction has subsided, thereby obtaining a prepolymer. Hereinafter, this prepolymer is referred to as "base agent (A-15)". Furthermore, the base agent (A-15) was a pale yellow transparent liquid and the viscosity at 25° C. was 3750 mPa·s. The properties thereof are shown in Table 5.

Production Example 8: Production of Base Agent (A-16)

a1-3 (carbodiimide-modified product of 4,4'-MDI, MILLIONATE MTL-C manufactured by Tosoh Corporation) is used as a base agent (A-16). Furthermore, the properties of the base agent (A-16) are shown in Table 5.

[Crosslinking Group Density Calculation Method]

The crosslinking group density shown in Table 5 and Tables 6 to 8 was calculated by using the following formula from the number average molecular weight obtained by GPC measurement along with the number of functional groups and the hydroxyl value disclosed from each raw material manufacturer. Note that, the GPC measurement was performed according to <GPC measurement conditions of curing agent> described below.

$$\text{Crosslinking group density (mmol/g)}=[1000\times(\text{Number of functional groups}-2)]/\text{Number average molecular weight}=[\text{Hydroxyl value}\times(\text{Number of functional groups}-2)]/(56.11\times\text{Number of functional groups}) \quad [\text{Mathematical Formula 2}]$$

TABLE 5

| | Base agent | Production Example 1 A-6 | Production Example 2 A-7 | Production Example 3 A-8 | Production Example 4 A-9 | Production Example 5 A-10 | Production Example 6 A-11 | Production Example 7 A-12 | Production Example 8 A-13 |
|---|---|---|---|---|---|---|---|---|---|
| Composition (g) | a1-1 | 193 | 231 | 231 | 237 | 204 | 203 | 300 | — |
| | a1-2 | 450 | 538 | 538 | 553 | 476 | 473 | 300 | — |
| | a1-4 | — | — | — | — | — | — | — | 1000 |
| | a2-1 | 269 | — | — | — | — | — | — | — |
| | a2-2 | 88 | — | — | — | — | — | — | — |
| | a2-3 | — | 231 | 231 | 210 | — | — | — | — |
| | a2-4 | — | — | — | — | 320 | 270 | — | — |
| | a2-5 | — | — | — | — | — | 54 | 400 | — |
| | Catalyst a3-1 | 0.1 | 0.1 | — | 0.1 | 0.1 | 0.1 | — | — |
| | Catalyst a3-2 | — | — | 0.006 | — | — | — | — | — |
| | Active methylene | — | — | 0.005 | — | — | — | — | — |
| | Catalyst poison a4 | 0.14 | 0.14 | 0.004 | 0.14 | 0.14 | 0.14 | — | — |

TABLE 5-continued

|  | Base agent | Production Example 1 A-6 | Production Example 2 A-7 | Production Example 3 A-8 | Production Example 4 A-9 | Production Example 5 A-10 | Production Example 6 A-11 | Production Example 7 A-12 | Production Example 8 A-13 |
|---|---|---|---|---|---|---|---|---|---|
| Properties | NCO content (%) | 13.5 | 16.1 | 16.1 | 17.7 | 13.8 | 13.5 | 15.2 | 28.6 |
|  | MDI monomer content (%) | 25.2 | 29.9 | 29.9 | 35.2 | 24.9 | 25.0 | 34.1 | 75.0 |
|  | Crosslinking group density (mmol/g) | 0.09 | 0.00 | 0.00 | 0.00 | 0.00 | 0.10 | 0.30 | 0.45 |
|  | Viscosity (mPa · s; 25° C.) | 3330 | 3640 | 3630 | 1680 | 1950 | 4120 | 3750 | 50 |

Preparation Examples 13 to 24 of Curing Agent (B)

Respective raw materials for b1, b2, b3, and a2 were charged according to the blending ratio shown in Table 6 and stirred and uniformly mixed, thereby obtaining curing agents (B-13) to (B-24). The properties of the curing agents (B-13) to (B-24) are shown in Table 6.

Examples 8 to 17 and Comparative Examples 10 to 18

In Examples 8 to 17 and Comparative Examples 10 to 18, urethane resin compositions having the compositions shown in Table 7 and Table 8 were molded.

TABLE 6

|  | Curing agent | Preparation Example 13 B-13 | Preparation Example 14 B-14 | Preparation Example 15 B-15 | Preparation Example 16 B-16 | Preparation Example 17 B-17 | Preparation Example 18 B-18 |
|---|---|---|---|---|---|---|---|
| Composition | b1-1 (pars by mass) | 30 | 35 | 19 | 30 | 50 | 100 |
|  | a2-5 (pars by mass) | 35 | 17 | — | 10 | — | — |
|  | b2-3 (pars by mass) | 10 | 15 | 59 | 35 | 24 | — |
|  | b3-1 (pars by mass) | 25 | 23 | 22 | 20 | 16 | — |
|  | b3-2 (pars by mass) | — | 10 | — | 5 | 10 | — |
| Properties | Viscosity (mPa · s; 25° C.) | 1700 | 1980 | 1060 | 1800 | 1670 | 4800 |
|  | Hydroxyl value (KOHmg/g) | 304 | 314 | 267 | 276 | 267 | 155 |
|  | Crosslinking group density (mmol/g) | 2.48 | 2.30 | 1.82 | 1.96 | 1.99 | 1.84 |
|  | Castor oil polymerization product content (%) | 16.2 | 18.9 | 10.3 | 16.2 | 27.0 | 54.0 |

|  | Curing agent | Preparation Example 19 B-19 | Preparation Example 20 B-20 | Preparation Example 21 B-21 | Preparation Example 22 B-22 | Preparation Example 23 B-23 | Preparation Example 24 B-24 |
|---|---|---|---|---|---|---|---|
| Composition | b1-1 (pars by mass) | 10 | — | — | — | — | — |
|  | a2-5 (pars by mass) | 20 | 65 | 52 | 12 | 100 | 76 |
|  | b2-3 (pars by mass) | 52 | 10 | 15 | 66 | — | — |
|  | b3-1 (pars by mass) | 15 | 25 | 23 | 22 | — | 24 |
|  | b3-2 (pars by mass) | 3 | — | 10 | — | — | — |
| Properties | Viscosity (mPa · s; 25° C.) | 930 | 1320 | 950 | 950 | 690 | 1300 |
|  | Hydroxyl value (KOHmg/g) | 235 | 306 | 315 | 265 | 160 | 304 |
|  | Crosslinking group density (mmol/g) | 1.33 | 2.15 | 1.92 | 1.56 | 0.74 | 2.16 |
|  | Castor oil polymerization product content (%) | 5.4 | 0.0 | 0.0 | 0.0 | 0.0 | 0.0 |

Values described in Table 7 and Table 8 were calculated from the following test results.

Note that, the NCO content measurement, the MDI monomer content measurement, the castor oil polymerization product content measurement, and the appearance evaluation were performed in the same manner as in Examples 1 to 7 and Comparative Examples 1 to 9.

[Production of Sample for Methanol Extraction Test]

Examples 8 to 17 and Comparative Examples 10 to 18

60 g of a base agent and 40 g of a curing agent were promptly measured with a 500 ml plastic cup as combinations of base agents (A-9) to (A-16) and curing agents (B-13) to (B-24) shown in Table 7 and Table 8 under the conditions of a liquid temperature of 25° C. or 45° C. and an isocyanate group/an active hydrogen group=1.00 or 1.05 (molar ratio). The resultant product was mixed with a spatula for 30 seconds and vacuum-defoamed at 50 mmHg for 60 seconds. The mixed liquid after defoaming was developed on exfoliate paper to be formed in a sheet having a thickness of 1 mm, and the sheet was left to stand still at a temperature of 45° C. for 2 hours in a thermostat bath.

[Methanol Extraction Test]

The low-molecular-weight eluted product values of the resin cured products obtained in Examples 8 to 17 and Comparative Examples 10 to 18 were measured by the following method.

First, a methanol extraction measurement sample obtained in each of Examples and Comparative Examples was cut into 10 mm square. Next, 20 g of the cut sample and 200 g of methanol were put in a 500 ml sample bottle, the bottle was closed airtight and shaken for 24 hours at 25° C. After shaking, filtration was further performed, the extraction liquid was collected in a 300 ml eggplant flask and evaporated to dryness. Then, the methanol extraction rate was obtained by the following formula.

Methanol extraction rate (%)={Eggplant flask mass (g) after evaporation to dryness−Eggplant flask empty mass (g)}/Sample mass (g)×100

The methanol extraction rate is preferably less than 1.0%.

[Production of Sample for Low-Molecular-Weight Elution Test]

Examples 8 to 17 and Comparative Examples 10 to 18

A base agent and a curing agent were blended as combinations of base agents (A-9) to (A-16) and curing agents (B-13) to (B-24) shown in Table 7 and Table 8 under the conditions of a liquid temperature of 25° C. or 45° C. and an isocyanate group/an active hydrogen group=1.00 or 1.05 (molar ratio) so that the total mass became 30 g, thereby producing a mixed liquid. Then, the obtained mixed liquid was stirred for 15 seconds. 10 g of glycerin was further added (assuming glycerin contained in the hollow fiber) and stirred for 15 seconds, thereby obtaining a polyurethane resin cured product. This resin cured product was left to stand still under the primary curing conditions of a temperature of 50° C. and a time of 10 minutes and under the secondary curing conditions of a temperature of 45° C. and a time of 2 hours.

[Low-Molecular-Weight Eluted Product Extraction Test]

The low-molecular-weight eluted product values of the resin cured products obtained in Examples 8 to 17 and Comparative Examples 10 to 18 were measured by the following method.

First, 20 g of each of those, which were obtained by cutting the low-molecular-weight eluted product value measurement sample obtained in each of Examples and Comparative Examples into a fan shape, was weighed, immersed in 100 ml of purified water previously heated to 40° C., and left to stand still for 2 hours at 40° C., and a low-molecular-weight eluted product was extracted in purified water. Next, the obtained extraction liquid was decanted, 10 ml thereof was put in a 50 ml measuring flask, and a liquid adjusted to 50 ml with purified water was used as a test liquid. Then, the UV absorbance measurement (manufactured by SHIMADZU CORPORATION, product name UV-1500) of the test liquid was performed. A value of 1/10 of the maximum value of the absorbance at 240 to 245 nm was regarded as the low-molecular-weight eluted product value. The low-molecular-weight eluted product value is preferably less than 0.07 and more preferably less than 0.065.

[Mixed Viscosity•Pot Life Test]

In Examples 8 to 17 and Comparative Examples 10 to 18, the mixed viscosity and the pot life at the time of obtaining a resin cured product were obtained by the following methods.

The base agent and the curing agent whose temperature was adjusted in advance to 25° C. or 45° C. were measured so that the total amount was 50 g based on blending of the isocyanate group/the active hydrogen group=1.00 (molar ratio) or 1.05 (molar ratio), and mixed so as to obtain a mixture. Next, the viscosity of the mixture was measured under 25° C. atmosphere by using a rotating viscometer (B type, No. 4 rotor). A viscosity after 60 seconds from a time point at which mixing of the base agent and the curing agent was started was regarded as a mixed viscosity, and a time until the viscosity of the mixture reached 50000 mPa·s was regarded as a pot life (sec). When the mixed viscosity was 1800 mPa·s or less and the pot life was within 1800 seconds, the filling properties were determined as good, and when the pot life was within 300 seconds, rapid curing properties were determined as good.

[Hardness Evaluation]

The Shore D hardness at 25° C. of the cured product used in the appearance evaluation was measured. Results are shown in Table 7 and Table 8. Note that, the hardness was measured according to JIS K 7312:1996.

TABLE 7

| | Example 7 | Example 8 | Example 9 | Example 10 | Example 11 | Example 12 | Example 13 | Example 14 | Example 15 | Example 16 |
|---|---|---|---|---|---|---|---|---|---|---|
| Base agent | A-6 | A-6 | A-7 | A-7 | A-7 | A-7 | A-8 | A-9 | A-10 | A-11 |
| Curing agent | B-13 | B-14 | B-15 | B-16 | B-17 | B-18 | B-16 | B-19 | B-13 | B-13 |
| Base agent/curing agent (molar ratio) | 1.00 | 1.00 | 1.00 | 1.00 | 1.00 | 1.00 | 1.00 | 1.00 | 1.00 | 1.00 |
| Liquid temperature (° C.) | 45 | 45 | 45 | 45 | 45 | 45 | 45 | 25 | 45 | 45 |
| In system Crosslinking group density (mmol/g) | 0.97 | 0.89 | 0.80 | 0.84 | 0.87 | 1.07 | 0.84 | 0.67 | 0.92 | 0.98 |

TABLE 7-continued

|  | Example 7 | Example 8 | Example 9 | Example 10 | Example 11 | Example 12 | Example 13 | Example 14 | Example 15 | Example 16 |
|---|---|---|---|---|---|---|---|---|---|---|
| Monomer MDI (%) | 15.8 | 16.1 | 16.8 | 17.1 | 16.8 | 12.6 | 17.1 | 17.6 | 15.7 | 15.8 |
| Castor oil polymerization product content (%) | 6.0 | 6.8 | 4.5 | 7.0 | 11.9 | 31.3 | 7.0 | 2.7 | 6.0 | 6.0 |
| Methanol extraction rate (%) | 0.89 | 0.97 | 0.73 | 0.65 | 0.46 | 0.51 | 0.70 | 0.80 | 0.45 | 0.46 |
| Low-molecular-weight eluted product value | 0.060 | 0.051 | 0.051 | 0.037 | 0.043 | 0.030 | 0.039 | 0.040 | 0.048 | 0.045 |
| Mixed viscosity (mPa·s) | 1350 | 1530 | 1180 | 1290 | 1470 | 1350 | 1310 | 1180 | 1550 | 1800 |
| Pot life | 234 | 238 | 244 | 207 | 208 | 1484 | 209 | 558 | 268 | 224 |
| Hardness (D hardness) momentary value | 71 | 68 | 67 | 72 | 76 | 41 | 72 | 61 | 75 | 75 |
| Molded product appearance | A | A | A | A | A | A | A | A | A | A |

TABLE 8

|  |  | Comparative Example 10 | Comparative Example 11 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|---|---|
|  | Base agent | A-6 | A-6 | A-7 | A-7 | A-10 | A-11 | A-12 | A-13 | A-13 |
|  | Curing agent | B-20 | B-21 | B-22 | B-23 | B-20 | B-20 | B-24 | B-18 | B-23 |
|  | Base agent/curing agent (molar ratio) | 1.00 | 1.00 | 1.00 | 1.00 | 1.00 | 1.00 | 1.00 | 1.05 | 1.05 |
|  | Liquid temperature (°C.) | 45 | 45 | 45 | 45 | 45 | 45 | 45 | 45 | 45 |
| In system | Crosslinking group density (mmol/g) | 0.85 | 0.75 | 0.68 | 0.42 | 0.79 | 0.86 | 1.04 | 1.39 | 0.65 |
|  | Monomer MDI (%) | 15.8 | 16.1 | 16.8 | 12.9 | 15.7 | 15.8 | 20.5 | 23.0 | 23.4 |
|  | Castor oil polymerization product content (%) | 0.0 | 0.0 | 0.0 | 0.0 | 0.0 | 0.0 | 0.0 | 36.7 | 0.0 |
|  | Methanol extraction rate (%) | 1.20 | 1.35 | 0.78 | 1.25 | 0.63 | 0.68 | 0.56 | 0.53 | 0.81 |
|  | Low-molecular-weight eluted product value | 0.085 | 0.055 | 0.071 | 0.054 | 0.076 | 0.071 | 0.072 | 0.051 | 0.177 |
|  | Mixed viscosity (mPa·s) | 980 | 880 | 1020 | 290 | 1180 | 1640 | 1380 | 740 | 200 |
|  | Pot life | 257 | 257 | 237 | 5849 | 280 | 235 | 212 | 607 | 2880 |
|  | Hardness (D hardness) momentary value | 68 | 65 | 67 | 16 | 73 | 73 | 59 | 48 | 30 |
|  | Molded product appearance | A | A | A | A | A | A | A | C | B |

According to one aspect of the present disclosure, it is possible to provide a polyurethane resin-forming composition contributing to formation of a urethane resin that is excellent in moldability, has a suppressed elution amount of a low-molecular-weight reaction product of MDI and glycerin, and has excellent appearance and to provide a membrane-sealing material and a membrane module that use the composition. Therefore, the membrane-sealing material according to one aspect of the present disclosure can be suitably used as a membrane-sealing material constituting a separation device for medical use or industrial use.

According to another aspect of the present disclosure, it is possible to provide a polyurethane resin-forming composition contributing to formation of a urethane resin that has a low viscosity, is excellent in cast moldability, and has a reduced water elution amount of a low-molecular-weight reaction product of diphenylmethane diisocyanate and glycerin and a reduced solvent elution amount of a molded product and to provide a sealing material and a membrane module that use the forming composition. Therefore, the membrane-sealing material according to another aspect of the present disclosure can be suitably used as a membrane-sealing material constituting a separation device for medical use or industrial use.

The present invention has been described in detail with reference to specific embodiments, and it is obvious for those skilled in the art that various changes and modifications are possible without departing from the intention and the scope of the present invention.

Note that, all contents of the specification, claims, drawings, and abstract of Japanese Patent Application No. 2019-136226 filed on Jul. 24, 2019 and the specification, claims, drawings, and abstract of Japanese Patent Application No. 2020-008738 filed on Jan. 22, 2020 are cited in their entirety herein and are incorporated as a disclosure of the specification of the present invention.

REFERENCE SIGNS LIST

11: housing, 13: hollow fiber membrane, 15: first fluid inlet, 17: first fluid outlet, 19: membrane-sealing material, 100: membrane module (hollow fiber membrane module).

The invention claimed is:

1. A polyurethane resin-forming composition for a membrane-sealing material, comprising:
a polyisocyanate prepolymer (A); and
a curing agent (B), wherein
the polyisocyanate prepolymer (A) comprises a reaction product of
a diphenylmethane diisocyanate (a1-1) and/or a modified product of a diphenylmethane diisocyanate (a1-2), and
an active hydrogen-containing compound (a2),
the curing agent (B) comprises
a castor oil polymerized polyol (b1),
at least one polyol (b2) selected from the group consisting of castor oil and a castor oil-modified polyol, and
a hydroxyl group-containing amine-based compound (b3) other than the castor oil polymerized polyol (b1) and the polyol (b2)
the castor oil polymerized polyol (b1) comprises a castor oil polymerization product which is a homopolymer of a castor oil,
a content of the castor oil polymerization product is 1 mass % or more and 35 mass % or less with respect to a total amount of the polyisocyanate prepolymer (A) and the curing agent (B), and
a content of the hydroxyl group-containing amine-based compound (b3) in the curing agent (B) is 5 mass % or more and 30 mass % or less.

2. A membrane-sealing material comprising a cured product of the polyurethane resin-forming composition for a membrane-sealing material according to claim 1.

3. A membrane module comprising:
a main body unit;
a membrane; and
a membrane-sealing material sealing a gap between the main body unit and the membrane, wherein
the membrane-sealing material is the membrane-sealing material according to claim 2.

4. The membrane module according to claim 3, wherein the membrane is a plurality of hollow fiber membranes, and
the membrane-sealing material seals
a gap between the main body unit and at least a portion of the plurality of hollow fiber membranes, and
at least a portion of a mutual gap between the plurality of hollow fiber membranes.

5. A polyurethane resin-forming composition for a membrane-sealing material, comprising:
an allophanate group-containing polyisocyanate prepolymer (A'); and
a curing agent (B), wherein
the allophanate group-containing polyisocyanate prepolymer (A') comprises a reaction product of
a diphenylmethane diisocyanate (a1-1), and
an active hydrogen-containing compound (a2),
the curing agent (B) comprises
a castor oil polymerized polyol (b1),
at least one polyol (b2) selected from the group consisting of castor oil and a castor oil-modified polyol, and
a hydroxyl group-containing amine-based compound (b3) other than the castor oil polymerized polyol (b1) and the polyol (b2),
the castor oil polymerized polyol (b1) comprises a castor oil polymerization product which is a homopolymer of a castor oil,
a crosslinking group density of the polyurethane resin-forming composition for a membrane-sealing material is 0.65 mmol/g or more with respect to a total mass of the allophanate group-containing polyisocyanate prepolymer (A') and the curing agent (B), and
a content of the hydroxyl group-containing amine-based compound (b3) in the curing agent (B) is 5 mass % or more and 30 mass % or less.

6. The polyurethane resin-forming composition for a membrane-sealing material according to claim 5, wherein a content of the castor oil polymerization product is 1 mass % or more and 35 mass % or less with respect to a total amount of the allophanate group-containing polyisocyanate prepolymer (A') and the curing agent (B).

7. A membrane-sealing material comprising a cured product of the polyurethane resin-forming composition for a membrane-sealing material according to claim 5.

8. A membrane module comprising:
a main body unit;
a membrane; and
a membrane-sealing material sealing a gap between the main body unit and the membrane, wherein
the membrane-sealing material is the membrane-sealing material according to claim 7.

9. The membrane module according to claim 8, wherein the membrane is a plurality of hollow fiber membranes, and
the membrane-sealing material seals
a gap between the main body unit and at least a portion of the plurality of hollow fiber membranes, and
at least a portion of a mutual gap between the plurality of hollow fiber membranes.

10. A polyurethane resin-forming composition for a membrane-sealing material, comprising:
an allophanate group-containing polyisocyanate prepolymer (A'); and
a curing agent (B), wherein
the allophanate group-containing polyisocyanate prepolymer (A') comprises a reaction product of
a diphenylmethane diisocyanate (a1-1), and
an active hydrogen-containing compound (a2),
the curing agent (B) comprises
a castor oil polymerized polyol (b1),
at least one polyol (b2) selected from the group consisting of castor oil and a castor oil-modified polyol, and
a hydroxyl group-containing amine-based compound (b3) other than the castor oil polymerized polyol (b1) and the polyol (b2), the castor oil polymerized polyol (b1) comprises a castor oil polymerization product which is a homopolymer of a castor oil, a content of the castor oil polymerization product is 1 mass % or more and 35 mass % or less with respect to a total amount of the allophanate group-containing polyisocyanate prepolymer (A') and the curing agent (B) and a content of the hydroxyl group-containing amine-based compound (b3) in the curing agent (B) is 5 mass % or more and 30 mass % or less.

\* \* \* \* \*